US012693373B2

(12) United States Patent
Ashour et al.

(10) Patent No.: US 12,693,373 B2
(45) Date of Patent: Jul. 28, 2026

(54) CLOSED LOOP RADAR INTERFERENCE IDENTIFICATION AND MANAGEMENT

(71) Applicant: QUALCOMM Incorporated, San Diego, CA (US)

(72) Inventors: Mahmoud Ashour, San Diego, CA (US); Stelios Stefanatos, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 18/684,116

(22) PCT Filed: Sep. 27, 2022

(86) PCT No.: PCT/US2022/044896
§ 371 (c)(1),
(2) Date: Feb. 15, 2024

(87) PCT Pub. No.: WO2023/059484
PCT Pub. Date: Apr. 13, 2023

(65) Prior Publication Data

US 2024/0426971 A1 Dec. 26, 2024

(30) Foreign Application Priority Data

Oct. 4, 2021 (GR) .............................. 20210100668

(51) Int. Cl.
*G01S 7/02* (2006.01)
*G01S 7/00* (2006.01)
(Continued)

(52) U.S. Cl.
CPC .............. *G01S 7/023* (2013.01); *G01S 7/003* (2013.01); *G01S 7/354* (2013.01); *G01S 13/341* (2013.01);
(Continued)

(58) Field of Classification Search
CPC .......... G01S 7/023; G01S 7/003; G01S 7/354; G01S 13/341; G01S 13/584;
(Continued)

(56) References Cited

U.S. PATENT DOCUMENTS

| | | | | |
|---|---|---|---|---|
| 10,830,867 B2 * | 11/2020 | Lin | ......................... | G01S 13/86 |
| 11,711,254 B2 * | 7/2023 | Moghaddam | ......... | H04L 27/266 375/262 |

(Continued)

OTHER PUBLICATIONS

International Search Report and Written Opinion—PCT/US2022/044896—ISA/EPO—May 15, 2023.

(Continued)

*Primary Examiner* — Yonghong Li
(74) *Attorney, Agent, or Firm* — Holland & Hart LLP

(57) ABSTRACT

Methods systems, and devices for wireless communications are described. A first wireless device may transmit a first radar signal in a first frame, and may receive a reflected signal corresponding to the first radar signal in a second frame. The first wireless device may also receive a number of different transmissions including at least a second transmission from a second wireless device. To determine which signals are reflections from the first radar signal and which signals are interference, the first wireless device may monitor a third frame that is subsequent to the first and second frames for one or more interfering signals during a silence interval. In some other cases, the first wireless device may transmit a request for the second wireless device to modify a timing offset for the second transmission, and may monitor for the second transmission which may be shifted in frequency according to the timing offset.

30 Claims, 20 Drawing Sheets

(51) Int. Cl.

| | |
|---|---|
| ***G01S 7/35*** | (2006.01) |
| ***G01S 13/34*** | (2006.01) |
| ***G01S 13/58*** | (2006.01) |
| ***G01S 13/931*** | (2020.01) |

(52) U.S. Cl.
CPC .......... *G01S 13/584* (2013.01); *G01S 13/931* (2013.01); *G01S 2013/9316* (2020.01)

(58) Field of Classification Search
CPC ........... G01S 13/931; G01S 2013/9316; G01S 13/343; G01S 13/765
See application file for complete search history.

(56) References Cited

U.S. PATENT DOCUMENTS

| | | | |
|---|---|---|---|
| 2009/0309785 A1 | 12/2009 | Nalezinski et al. | |
| 2011/0291875 A1 | 12/2011 | Szajnowski | |
| 2016/0061935 A1* | 3/2016 | McCloskey | G01S 13/931 342/82 |
| 2017/0257773 A1* | 9/2017 | Boudreau | H04W 16/14 |
| 2019/0293748 A1* | 9/2019 | Gulati | G01S 7/023 |
| 2019/0339358 A1* | 11/2019 | Rimini | G01S 7/0232 |
| 2020/0326407 A1 | 10/2020 | Mccloskey et al. | |
| 2021/0195435 A1 | 6/2021 | Rimini et al. | |

OTHER PUBLICATIONS

Partial International Search Report—PCT/US2022/044896—ISA/EPO—Jan. 9, 2023.

* cited by examiner

Frequency

——— Ego Tx Chirp

—— Ego Tx Reflection

━━ Interferer Reflection $\tau_e$ $\tau_i$ $T_c$

Time 500-a

Frequency $f_i = S \tau_i$ $f_e = S \tau_e$ $\tau_e$   $\tau_i$     $T_c$

Time

Ego Radar Rx Mixer Output 500-b

Ego Radar Rx Mixer Output

Reflection due to interferer Tx after timing offset

Reflection due to interferer Tx before timing offset

Reflection due to radar Tx after timing offset

Reflection due to interferer Tx after timing offset

Reflection due to interferer Tx before timing offset

Reflection due to radar Tx after timing offset

Ego Radar Rx Mixer Output 700-a

Detection from Radar Reflection

Detection from Interference 700-b 115-d — UE 115-e — UE

UE — 115-f

805 — First Radar Transmission

First Radar
Transmission Reflection — 810

Second Radar Transmission — 815

Interference Tx — 820

825 — Monitoring during
Silence Interval

830 — Timing Offset Request

Second Radar Transmission (offset) — 835

800

Transmit a first radar signal in a first frame over a time duration

1305

Receive, in a second frame of the time duration, a first reflected signal corresponding to the transmitted first radar signal

1310

Monitor a third frame that is subsequent to the first and second frames for one or more interfering signals during a silence interval of the time duration, the silence interval associated with an absence of transmissions by the first wireless device

1315

1300

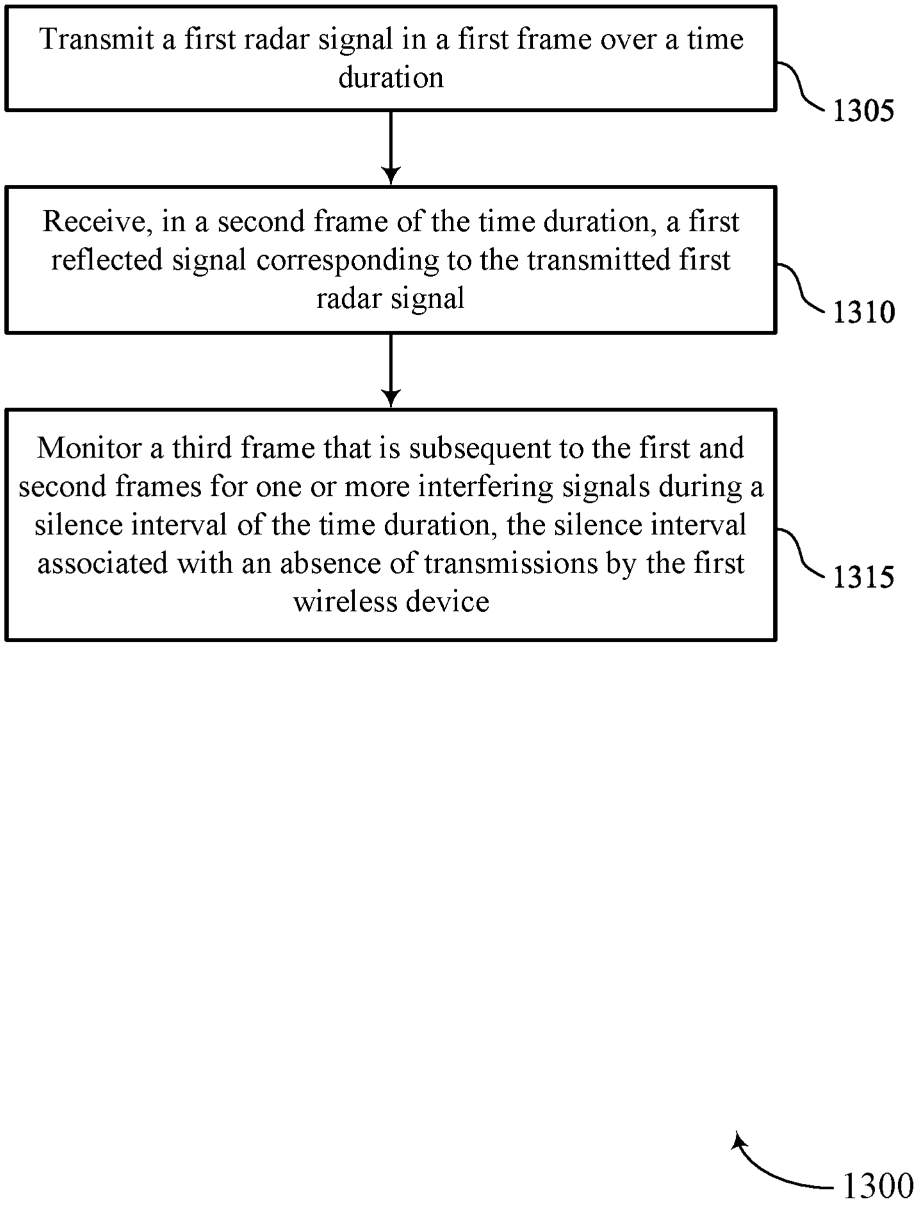

FIG. 13

Transmit a first radar signal in a first frame over a time duration ⟍ 1505

Receive, in a second frame of the time duration, a first reflected signal corresponding to the transmitted first radar signal ⟍ 1510

Monitor a third frame that is subsequent to the first and second frames for one or more interfering signals during a silence interval of the time duration, the silence interval associated with an absence of transmissions by the first wireless device ⟍ 1515

Determine an absence of interference at the first wireless device based at least in part on an absence of one or more interfering signals received during the silence interval ⟍ 1520

1500

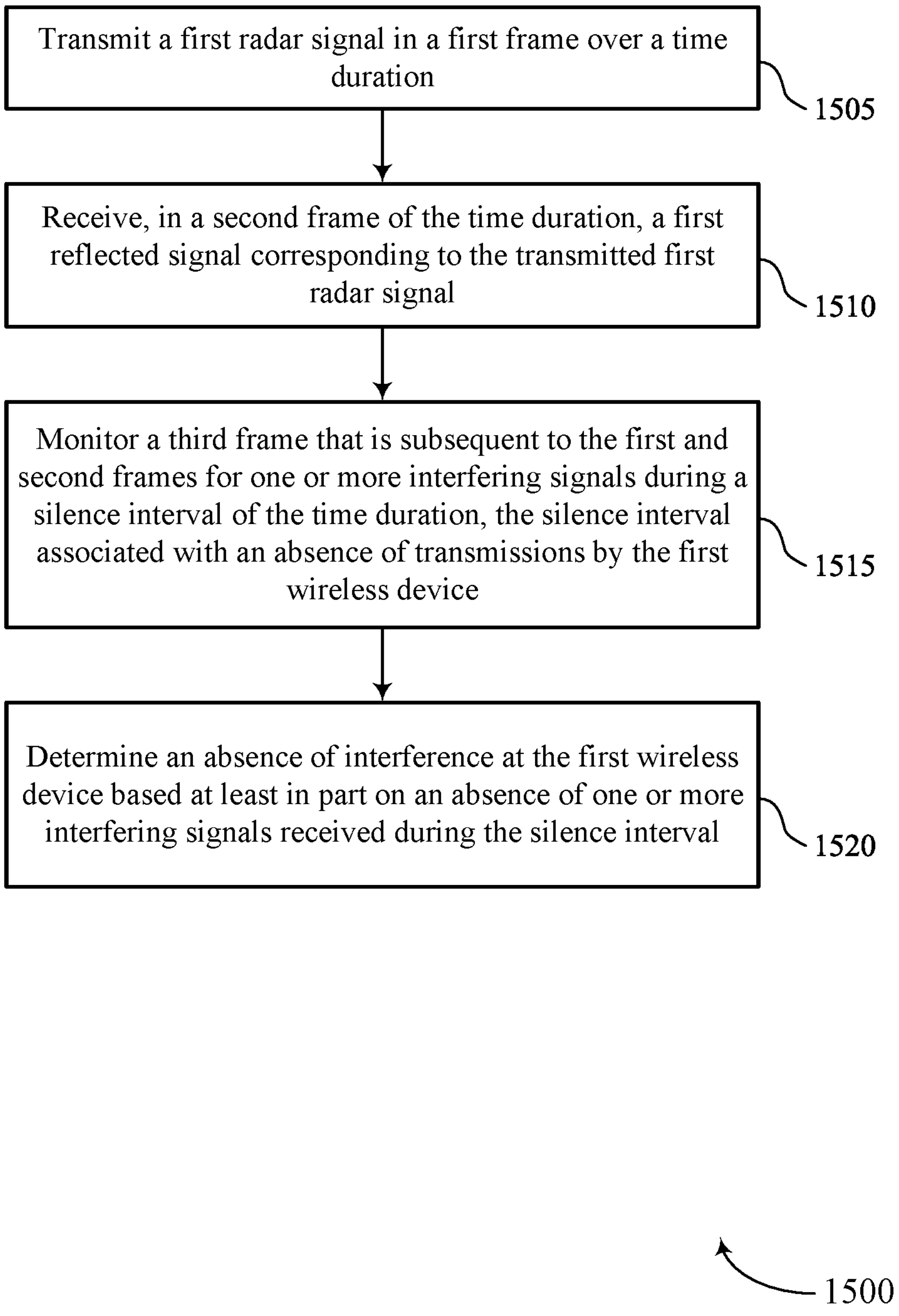

FIG. 15

Transmit, at a first time in a first frame, a first radar signal according to a radar transmission configuration for radar transmissions for the first wireless device

1605

Receive, in the first frame in response to the first radar signal, a plurality of transmissions comprising one or more signal reflections and at least a second transmission from a second wireless device

1610

Transmit, to the second wireless device, a request to modify a timing offset for the second transmission in a second frame by the second wireless device, the timing offset corresponding to a range shift for the second transmission received by the first wireless device

1615

Receive, in accordance with the timing offset in the second frame, the second transmission from the second wireless device based at least in part on the request

1620

1600

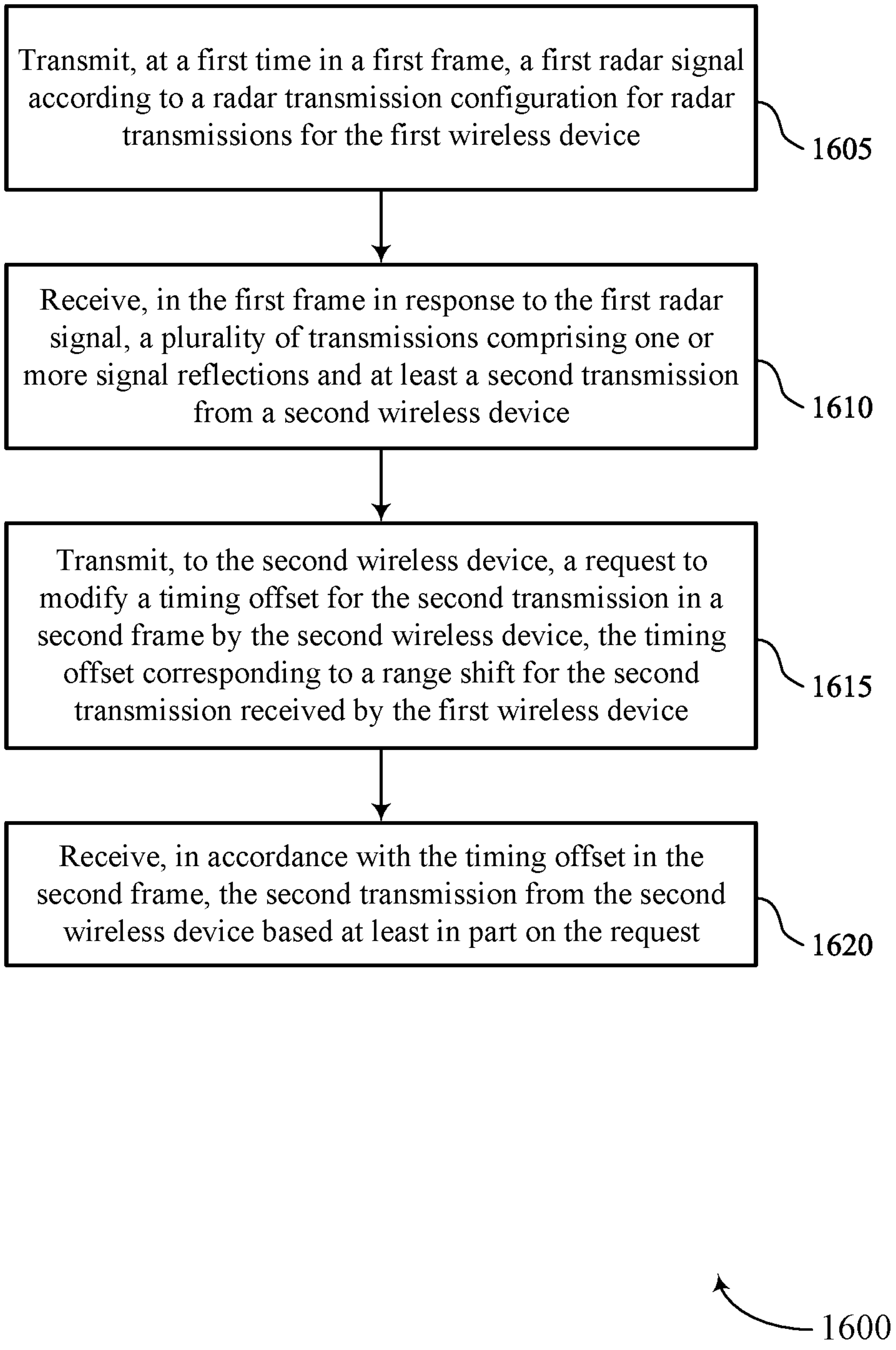

FIG. 16

Transmit, at a first time in a first frame, a first radar signal according to a radar transmission configuration for radar transmissions for the first wireless device          1705

Receive, in the first frame in response to the first radar signal, a plurality of transmissions comprising one or more signal reflections and at least a second transmission from a second wireless device          1710

Transmit, to the second wireless device, a request to modify a timing offset for the second transmission in a second frame by the second wireless device, the timing offset corresponding to a range shift for the second transmission received by the first wireless device          1715

Receive, in accordance with the timing offset in the second frame, the second transmission from the second wireless device based at least in part on the request          1720

Determine whether the second transmission is a reflected signal corresponding to the transmitted first radar signal or whether the second transmission is interfering transmission based at least in part on the range shift          1725

1700

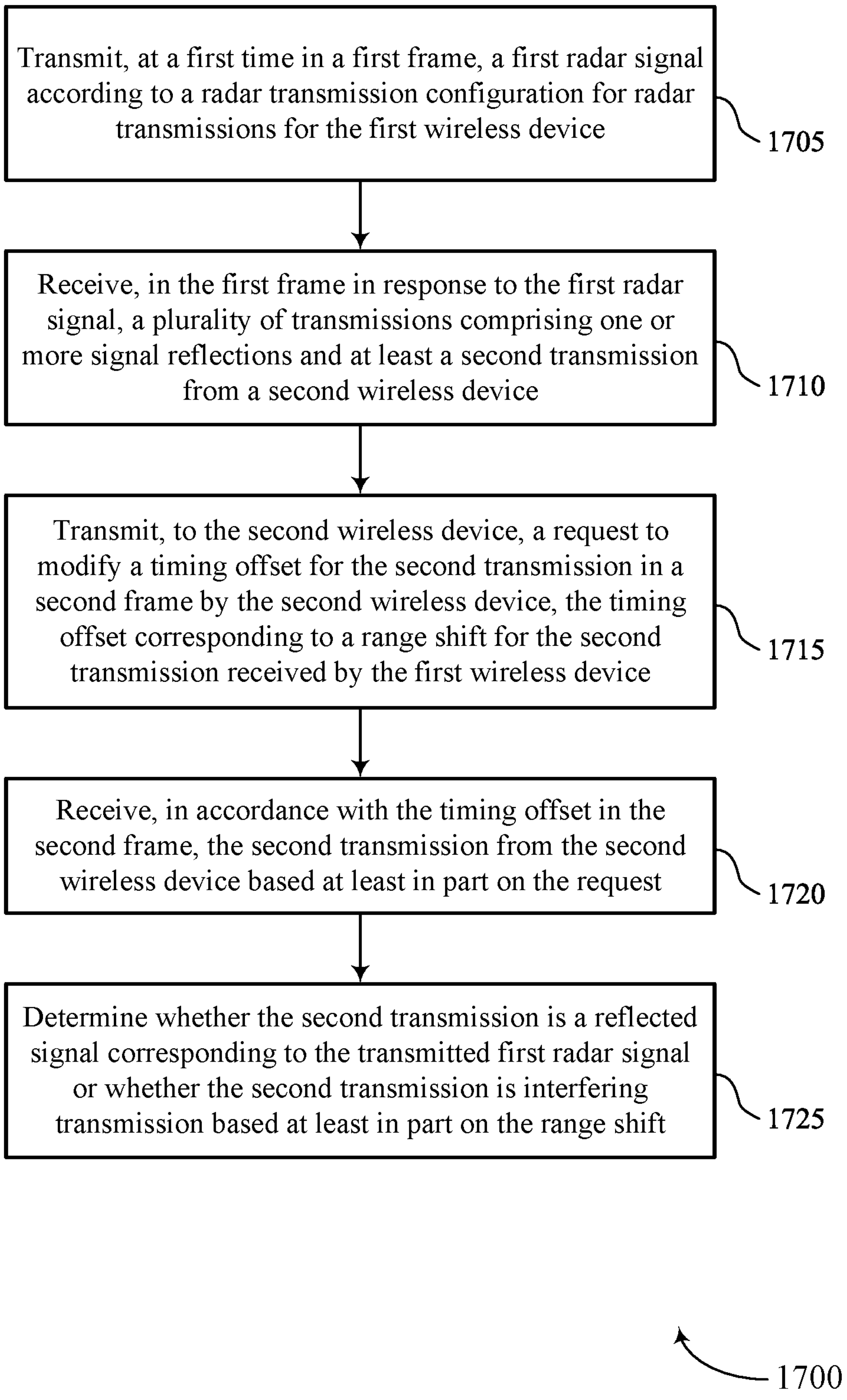

FIG. 17

Transmit, at a first time in a first frame, a first radar signal according to a radar transmission configuration for radar transmissions for the first wireless device

1805

Receive, in the first frame in response to the first radar signal, a plurality of transmissions comprising one or more signal reflections and at least a second transmission from a second wireless device

1810

Identify the second wireless device is a interfering wireless device associated with the first radar signal

1815

Modify the timing offset associated with transmitting the first transmission or receiving the second transmission at the first wireless device based at least in part on the identifying

1820

Transmit, to the second wireless device, a request to modify a timing offset for the second transmission in a second frame by the second wireless device, the timing offset corresponding to a range shift for the second transmission received by the first wireless device

1825

Receive, in accordance with the timing offset in the second frame, the second transmission from the second wireless device based at least in part on the request

1830

1800

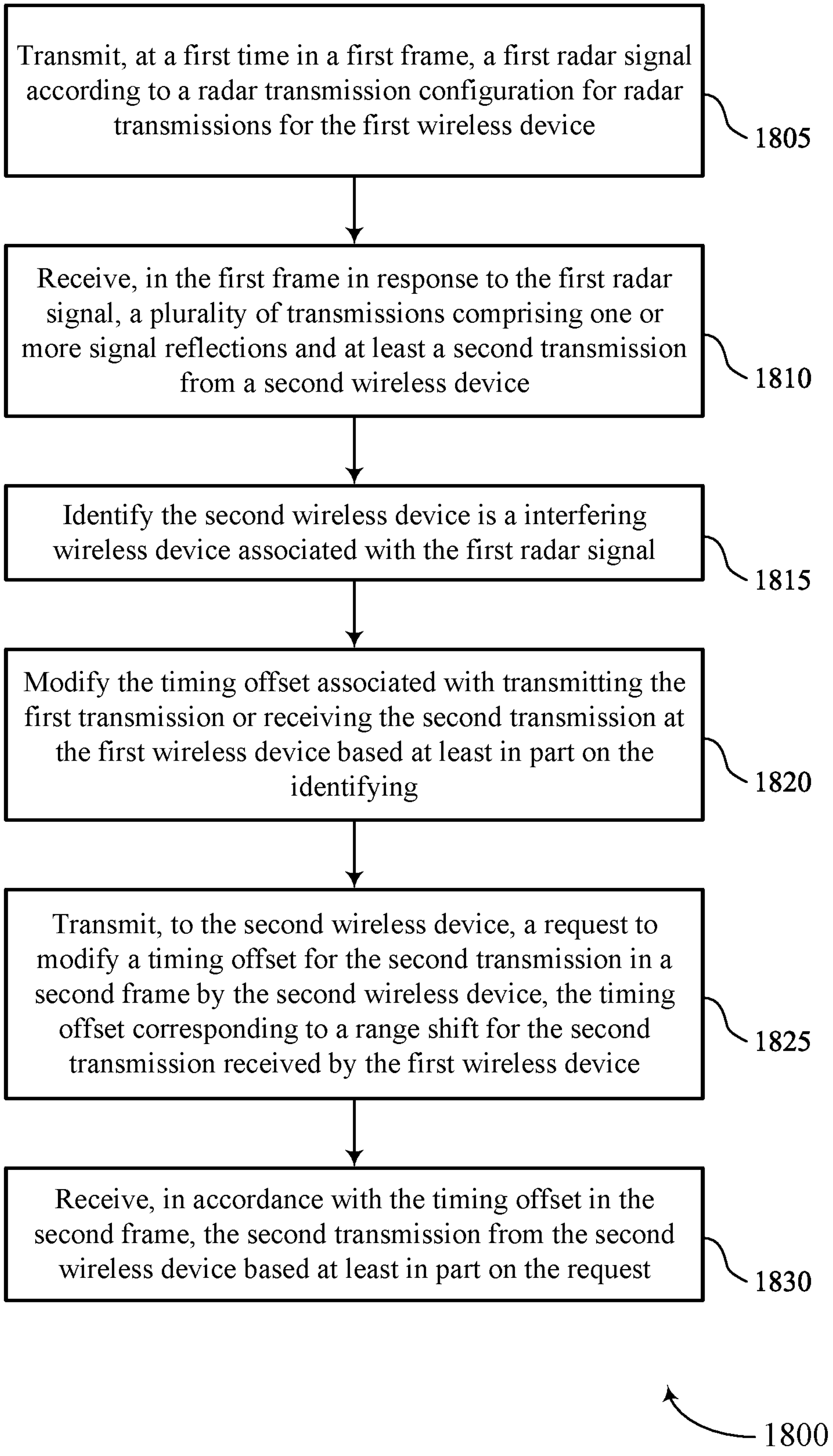

FIG. 18

Receive, at a first time in a first frame, a first radar signal from a first wireless device ⎯⎯2005

Transmit, in response to receiving the first radar signal, a first transmission to the first wireless device in the first frame ⎯⎯2010

Receive, from the first wireless device, a request to modify a timing offset for a second transmission by the second wireless device, the timing offset corresponding to a range shift for the second transmission to be received by the first wireless device ⎯⎯2015

Transmit, in accordance with the timing offset in a second frame, the second transmission to the first wireless device based at least in part on the request ⎯⎯2020

⎯2000

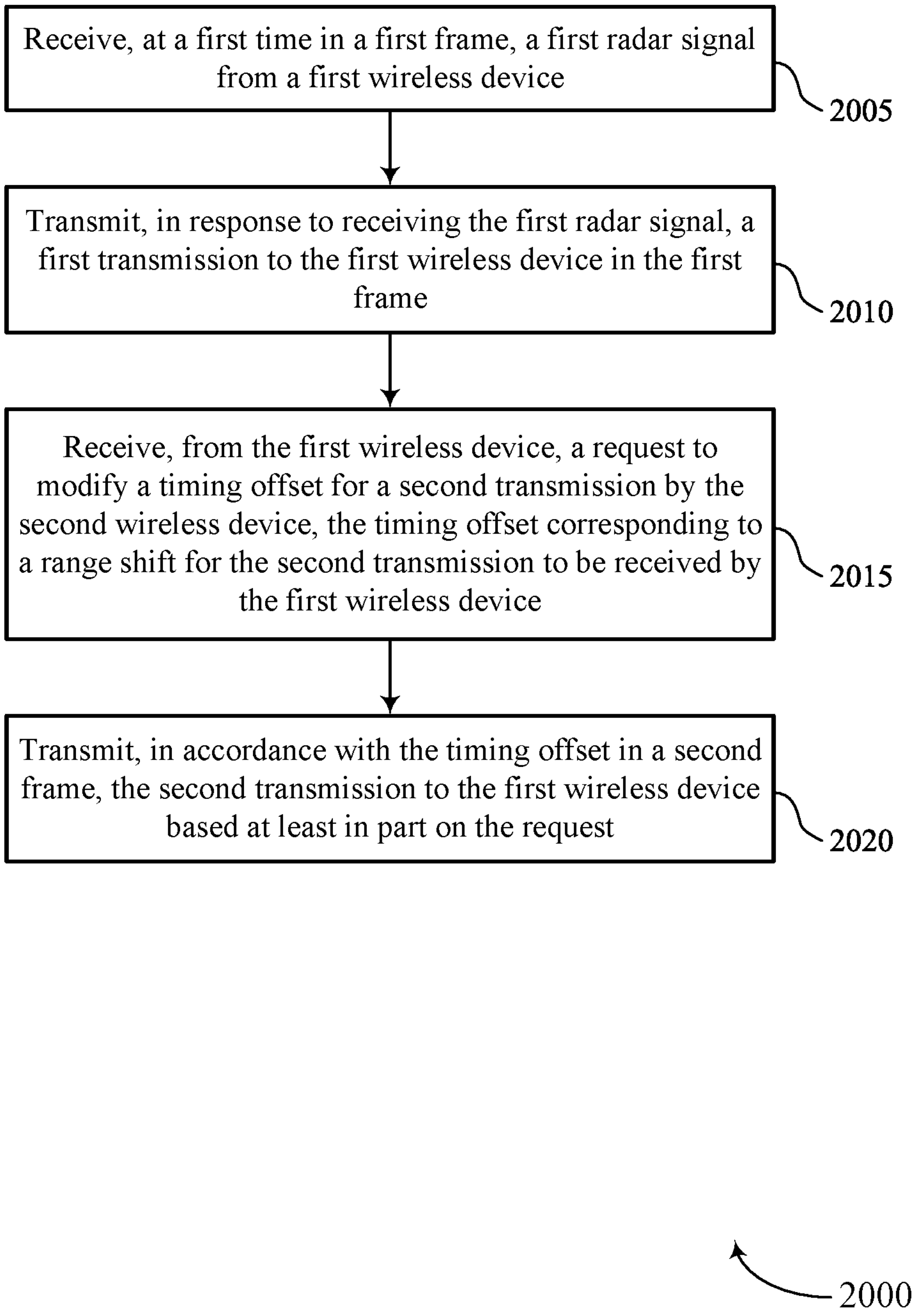

FIG. 20

CLOSED LOOP RADAR INTERFERENCE IDENTIFICATION AND MANAGEMENT

CROSS REFERENCE

The present Application is a 371 national stage filing of International PCT Application No. PCT/US2022/044896 by ASHOUR et al. entitled "CLOSED LOOP RADAR INTERFERENCE IDENTIFICATION AND MANAGEMENT," filed Sep. 27, 2022; and claims priority to Greece patent application Ser. No. 20210100668 by ASHOUR et al., entitled "CLOSED LOOP RADAR INTERFERENCE IDENTIFICATION AND MANAGEMENT," filed Oct. 4, 2021, each of which is assigned to the assignee hereof, and each of which is expressly incorporated by reference in its entirety herein.

FIELD OF TECHNOLOGY

The following relates to wireless communications, including closed loop radar interference identification and management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A communication device may be configured with one or more radars. A radar may experience interference from signals implemented for detection and collision avoidance. For example, a radar may transmit a signal and the radar signal may experience interference with another radar signal from another radar associated with another communication device. The interference may result in inaccurate and inefficient detection and collision avoidance. As more communication devices (e.g., vehicles in cellular vehicle-to-everything (C-V2X) systems) implement radar, interference may become more common which may obscure signaling.

SUMMARY

The described techniques relate to improved methods, systems, devices, and apparatuses that support closed loop radar interference identification and management. Generally, the described techniques provide for interference identification and manipulation in a wireless communications network which supports radar-based signaling. In some examples, to identify interference from potential interfering radar devices, a wireless communications device such as a user equipment (UE) may switch from transmitting radar signaling in every frame to randomly refraining from transmitting a radar signal in a frame (e.g., during a silence interval). If the UE receives a signal during the silence interval, the UE may determine that the received signal is from interference (and not a reflected signal from an original radar transmission).

In some other implementations, the UE may transmit a request to one or more surrounding devices to request that the devices identify themselves as potential interferers. Upon identifying the potential interferers, the UE may request that the other devices apply a time offset to their respective transmitted frames such that the wireless device receives the signals with a predictable frequency shift or range shift. The UE may be able to determine which transmissions are interference based on receiving transmissions from devices that are shifted in frequency or range as compared to the reflected radar signals, which may not exhibit frequency or range shifts. Additionally or alternatively, the UE may be able to shift the received interference using different time offsets.

A method for wireless communications at a first wireless device is described. The method may include transmitting a first radar signal in a first frame over a time duration, receiving, in a second frame of the time duration, a first reflected signal corresponding to the transmitted first radar signal, and monitoring a third frame that is subsequent to the first frame and the second frame for one or more interfering signals during a silence interval of the time duration, the silence interval associated with an absence of transmissions by the first wireless device.

An apparatus for wireless communications at a first wireless device is described. The apparatus may include a processor, memory coupled with the processor, and instructions stored in the memory. The instructions may be executable by the processor to cause the apparatus to transmit a first radar signal in a first frame over a time duration, receive, in a second frame of the time duration, a first reflected signal corresponding to the transmitted first radar signal, and monitor a third frame that is subsequent to the first frame and the second frame for one or more interfering signals during a silence interval of the time duration, the silence interval associated with an absence of transmissions by the first wireless device.

Another apparatus for wireless communications at a first wireless device is described. The apparatus may include means for transmitting a first radar signal in a first frame over a time duration, means for receiving, in a second frame of the time duration, a first reflected signal corresponding to the transmitted first radar signal, and means for monitoring a third frame that is subsequent to the first frame and the second frame for one or more interfering signals during a silence interval of the time duration, the silence interval associated with an absence of transmissions by the first wireless device.

A non-transitory computer-readable medium storing code for wireless communications at a first wireless device is described. The code may include instructions executable by a processor to transmit a first radar signal in a first frame over a time duration, receive, in a second frame of the time duration, a first reflected signal corresponding to the transmitted first radar signal, and monitor a third frame that is subsequent to the first frame and the second frame for one or more interfering signals during a silence interval of the time duration, the silence interval associated with an absence of transmissions by the first wireless device.

Some examples of the method, apparatuses, and non-transitory computer-readable medium described herein may further include operations, features, means, or instructions for detecting interference at the first wireless device based on the monitoring, where the interference may be detected based on receiving the one or more interfering signals during the silence interval of the time duration.

In some examples of the method, apparatuses, and non-transitory computer-readable medium described herein, detecting the one or more interfering signals at the first wireless device may include operations, features, means, or instructions for mixing the one or more interfering signals with a virtual waveform, where the virtual waveform may be based on the first radar signal transmitted in the first frame.

Some examples of the method, apparatuses, and non-transitory computer-readable medium described herein may further include operations, features, means, or instructions for transmitting a second radar signal in a fourth frame and receiving a second reflected signal based on tracking the interference from the one or more interfering signals by the first wireless device, where the one or more interfering signals may be different from the second reflected signal corresponding to the second radar signal.

Some examples of the method, apparatuses, and non-transitory computer-readable medium described herein may further include operations, features, means, or instructions for determining an absence of interference at the first wireless device based on an absence of one or more interfering signals received during the silence interval.

A method for wireless communications at a first wireless device is described. The method may include transmitting, at a first time in a first frame, a first radar signal according to a radar transmission configuration for radar transmissions for the first wireless device, receiving, in the first frame in response to the first radar signal, a set of multiple transmissions including one or more signal reflections and at least a second transmission from a second wireless device, transmitting, to the second wireless device, a request to modify a timing offset for the second transmission in a second frame by the second wireless device, the timing offset corresponding to a range shift for the second transmission received by the first wireless device, and receiving, in accordance with the timing offset in the second frame, the second transmission from the second wireless device based on the request.

An apparatus for wireless communications at a first wireless device is described. The apparatus may include a processor, memory coupled with the processor, and instructions stored in the memory. The instructions may be executable by the processor to cause the apparatus to transmit, at a first time in a first frame, a first radar signal according to a radar transmission configuration for radar transmissions for the first wireless device, receive, in the first frame in response to the first radar signal, a set of multiple transmissions including one or more signal reflections and at least a second transmission from a second wireless device, transmit, to the second wireless device, a request to modify a timing offset for the second transmission in a second frame by the second wireless device, the timing offset corresponding to a range shift for the second transmission received by the first wireless device, and receive, in accordance with the timing offset in the second frame, the second transmission from the second wireless device based on the request.

Another apparatus for wireless communications at a first wireless device is described. The apparatus may include means for transmitting, at a first time in a first frame, a first radar signal according to a radar transmission configuration for radar transmissions for the first wireless device, means for receiving, in the first frame in response to the first radar signal, a set of multiple transmissions including one or more signal reflections and at least a second transmission from a second wireless device, means for transmitting, to the second wireless device, a request to modify a timing offset for the second transmission in a second frame by the second wireless device, the timing offset corresponding to a range shift for the second transmission received by the first wireless device, and means for receiving, in accordance with the timing offset in the second frame, the second transmission from the second wireless device based on the request.

A non-transitory computer-readable medium storing code for wireless communications at a first wireless device is described. The code may include instructions executable by a processor to transmit, at a first time in a first frame, a first radar signal according to a radar transmission configuration for radar transmissions for the first wireless device, receive, in the first frame in response to the first radar signal, a set of multiple transmissions including one or more signal reflections and at least a second transmission from a second wireless device, transmit, to the second wireless device, a request to modify a timing offset for the second transmission in a second frame by the second wireless device, the timing offset corresponding to a range shift for the second transmission received by the first wireless device, and receive, in accordance with the timing offset in the second frame, the second transmission from the second wireless device based on the request.

Some examples of the method, apparatuses, and non-transitory computer-readable medium described herein may further include operations, features, means, or instructions for determining whether the second transmission may be a reflected signal corresponding to the transmitted first radar signal or whether the second transmission may be interfering transmission based on the range shift.

In some examples of the method, apparatuses, and non-transitory computer-readable medium described herein, receiving the set of multiple transmissions and the second transmission may include operations, features, means, or instructions for receiving the second transmission in accordance with the timing offset, the timing offset corresponding to a change in a generated beat frequency relative to a first transmission, the change in the generated beat frequency further associated with the range shift.

Some examples of the method, apparatuses, and non-transitory computer-readable medium described herein may further include operations, features, means, or instructions for transmitting the request to modify the timing offset in a sidelink control information message, where the sidelink control information message further includes a field which identifies position information of the first wireless device.

In some examples of the method, apparatuses, and non-transitory computer-readable medium described herein, the request to modify the timing offset further includes a request for the second wireless device to identify itself as an interfering device based on a distance between the first wireless device and the second wireless device and the method, apparatuses, and non-transitory computer-readable medium may include further operations, features, means, or instructions for establishing a unicast link with the second wireless device based on the second wireless device being identified as the interfering device.

Some examples of the method, apparatuses, and non-transitory computer-readable medium described herein may further include operations, features, means, or instructions for identifying the second wireless device may be a interfering wireless device associated with the first radar signal and modifying the timing offset associated with transmitting the first transmission or receiving the second transmission at the first wireless device based on the identifying.

In some examples of the method, apparatuses, and non-transitory computer-readable medium described herein, the request to modify the timing offset may be a broadcast message transmitted to the second wireless device and at least a third wireless device and the method, apparatuses, and non-transitory computer-readable medium may include further operations, features, means, or instructions for transmitting the request to modify the timing offset to the second wireless device and the third wireless device, where the timing offset may be the same or different for both the second wireless device and the third wireless device.

In some examples of the method, apparatuses, and non-transitory computer-readable medium described herein, a range of the second transmission may be within a detectable range of the second frame and the method, apparatuses, and non-transitory computer-readable medium may include further operations, features, means, or instructions for determining a value for the timing offset which shifts the measured range of the second transmission outside of the detectable range of the second frame and transmitting, to the second wireless device, the request to modify the timing offset to the determined value to shift the measured range of the second transmission.

In some examples of the method, apparatuses, and non-transitory computer-readable medium described herein, the measured range of the second transmission may be outside a detectable range of the second frame and the method, apparatuses, and non-transitory computer-readable medium may include further operations, features, means, or instructions for determining a value for the timing offset which shifts the measured range of the second transmission within the detectable range of the second frame and transmitting, to the second wireless device, the request to modify the timing offset to the determined value to shift the measured range of the second transmission.

Some examples of the method, apparatuses, and non-transitory computer-readable medium described herein may further include operations, features, means, or instructions for transmitting the request to modify the timing offset for the second transmission in a unicast message to the second wireless device or in a groupcast message to the second wireless device and at least one other additional wireless device.

Some examples of the method, apparatuses, and non-transitory computer-readable medium described herein may further include operations, features, means, or instructions for transmitting the request to modify the timing offset for the second transmission in accordance with a semi-persistent scheduling configuration, where the first wireless device reserves a set of periodic resources for transmitting the request.

Some examples of the method, apparatuses, and non-transitory computer-readable medium described herein may further include operations, features, means, or instructions for identifying one or more updates to the request outside of the set of periodic resources of the semi-persistent scheduling configuration and transmitting the one or more updates to the request using resources outside of the semi-persistent scheduling configuration.

In some examples of the method, apparatuses, and non-transitory computer-readable medium described herein, the timing offset includes a timing advance or a timing delay relative to a timing of the first frame.

A method for wireless communications at a second wireless device is described. The method may include receiving, at a first time in a first frame, a first radar signal from a first wireless device, transmitting, in response to receiving the first radar signal, a first transmission to the first wireless device in the first frame, receiving, from the first wireless device, a request to modify a timing offset for a second transmission by the second wireless device, the timing offset corresponding to a range shift for the second transmission to be received by the first wireless device, and transmitting, in accordance with the timing offset in a second frame, the second transmission to the first wireless device based on the request.

An apparatus for wireless communications at a second wireless device is described. The apparatus may include a processor, memory coupled with the processor, and instructions stored in the memory. The instructions may be executable by the processor to cause the apparatus to receive, at a first time in a first frame, a first radar signal from a first wireless device, transmit, in response to receiving the first radar signal, a first transmission to the first wireless device in the first frame, receive, from the first wireless device, a request to modify a timing offset for a second transmission by the second wireless device, the timing offset corresponding to a range shift for the second transmission to be received by the first wireless device, and transmit, in accordance with the timing offset in a second frame, the second transmission to the first wireless device based on the request.

Another apparatus for wireless communications at a second wireless device is described. The apparatus may include means for receiving, at a first time in a first frame, a first radar signal from a first wireless device, means for transmitting, in response to receiving the first radar signal, a first transmission to the first wireless device in the first frame, means for receiving, from the first wireless device, a request to modify a timing offset for a second transmission by the second wireless device, the timing offset corresponding to a range shift for the second transmission to be received by the first wireless device, and means for transmitting, in accordance with the timing offset in a second frame, the second transmission to the first wireless device based on the request.

A non-transitory computer-readable medium storing code for wireless communications at a second wireless device is described. The code may include instructions executable by a processor to receive, at a first time in a first frame, a first radar signal from a first wireless device, transmit, in response to receiving the first radar signal, a first transmission to the first wireless device in the first frame, receive, from the first wireless device, a request to modify a timing offset for a second transmission by the second wireless device, the timing offset corresponding to a range shift for the second transmission to be received by the first wireless device, and transmit, in accordance with the timing offset in a second frame, the second transmission to the first wireless device based on the request.

In some examples of the method, apparatuses, and non-transitory computer-readable medium described herein, transmitting the second transmission to the first wireless device may include operations, features, means, or instructions for transmitting the second transmission in accordance with the timing offset, the timing offset corresponding to a change in a generated beat frequency relative to the first transmission, the change in the generated beat frequency further associated with the range shift.

Some examples of the method, apparatuses, and non-transitory computer-readable medium described herein may further include operations, features, means, or instructions for receiving the request to modify the timing offset in a sidelink control information message, where the sidelink control information message further includes a field which identifies position information of the first wireless device.

In some examples of the method, apparatuses, and non-transitory computer-readable medium described herein, the request to modify the timing offset further includes a request for the second wireless device to identify itself as an interfering device based on a distance between the first wireless device and the second wireless device and the method, apparatuses, and non-transitory computer-readable medium may include further operations, features, means, or instructions for establishing a unicast link with the first wireless device based on the first wireless device being identified as the interfering device.

Some examples of the method, apparatuses, and non-transitory computer-readable medium described herein may further include operations, features, means, or instructions for receiving the timing offset associated with transmitting the second transmission to the first wireless device based on the second wireless device being an interfering wireless device.

In some examples of the method, apparatuses, and non-transitory computer-readable medium described herein, the request to modify the timing offset may be a broadcast message transmitted by the first wireless device to the second wireless device and at least a third wireless device and the method, apparatuses, and non-transitory computer-readable medium may include further operations, features, means, or instructions for receiving the request to modify the timing offset, where the timing offset may be the same or different for both the second wireless device and the third wireless device.

Some examples of the method, apparatuses, and non-transitory computer-readable medium described herein may further include operations, features, means, or instructions for receiving, from the first wireless device in a unicast message or in a groupcast message, the request to modify the timing offset for the second transmission.

Some examples of the method, apparatuses, and non-transitory computer-readable medium described herein may further include operations, features, means, or instructions for receiving the request to modify the timing offset for the second transmission on a set of periodic resources in accordance with a semi-persistent scheduling configuration.

Some examples of the method, apparatuses, and non-transitory computer-readable medium described herein may further include operations, features, means, or instructions for receiving one or more updates to the request using resources outside of the semi-persistent scheduling configuration.

In some examples of the method, apparatuses, and non-transitory computer-readable medium described herein, the timing offset includes a timing advance or a timing delay relative to a timing of the first frame.

BRIEF DESCRIPTION OF THE DRAWINGS

FIGS. 13 through 20 show flowcharts illustrating methods that support closed loop radar interference identification and management in accordance with aspects of the present disclosure.

DETAILED DESCRIPTION

Figure 1:
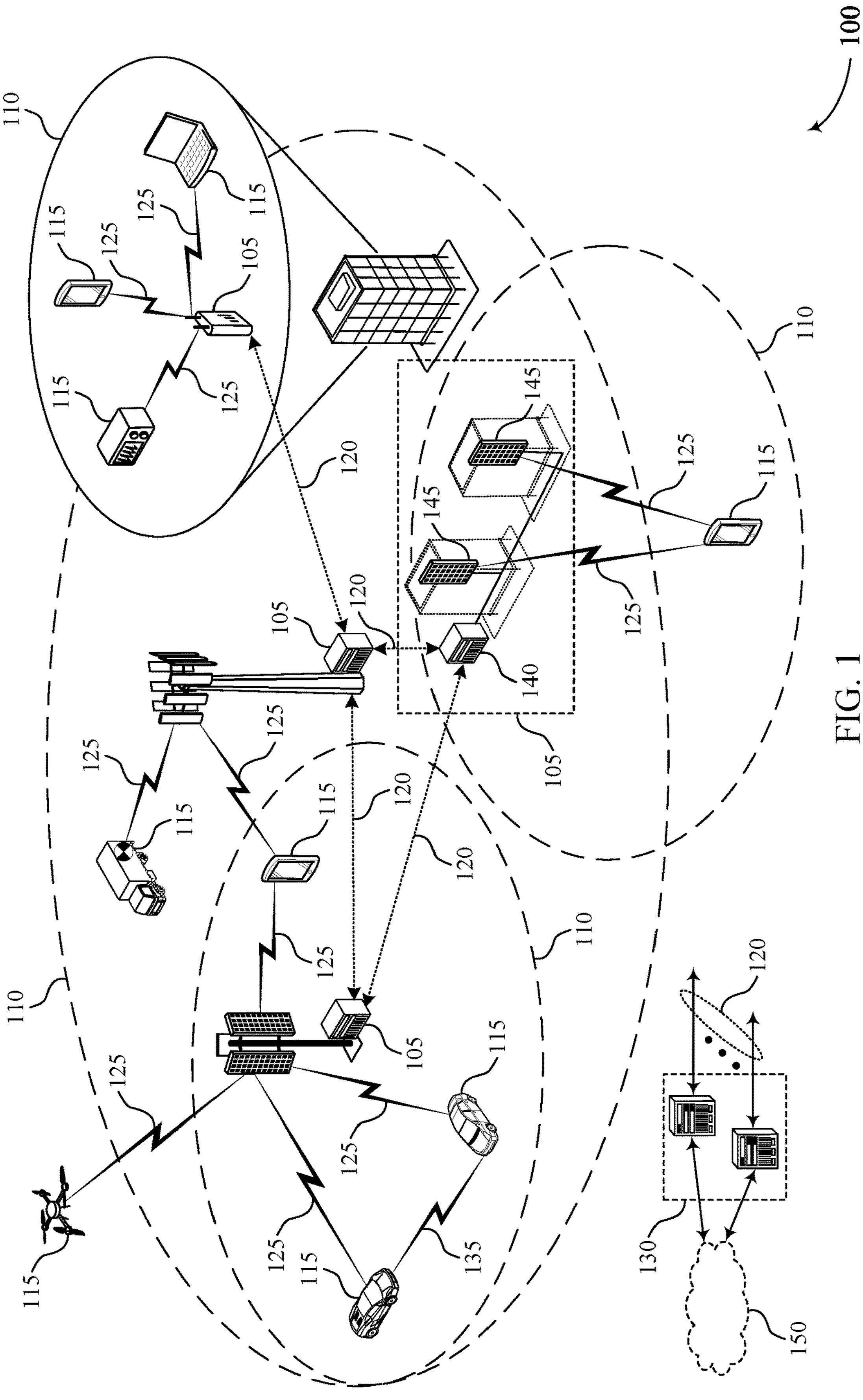
FIGS. 1 and 2 illustrates example wireless communications systems that supports closed loop radar interference identification and management in accordance with aspects of the present disclosure.

Some wireless communications system may support radar signaling between communication devices configured with one or multiple radars. A radar may transmit signaling (e.g., electromagnetic waves) and receive (e.g., detect) reflected signals in order to estimate properties (e.g., relative distance, speed, and angular location) of nearby targets. One or more radars may be used by the communication devices (e.g., vehicles) as a sensor input which may enable advanced driver assistance systems (ADAS), among other examples. In some cases, a communication device configured with at least one radar may detect stray signaling or interference from one or more nearby communication device configured with one or more radars.

Multiple communication devices (e.g., radars) may operate over a same frequency band of a frequency spectrum, which may cause interference and produce an increased broadband noise floor and ghost targets (e.g., apparent targets). A communication device such as a radar-equipped wireless device or user equipment (UE) may transmit a signal at a respective frequency band of a frequency spectrum. The communication device may be configured to detect signals (e.g., reflected signals) of the transmitted signal at the respective frequency band. In some cases, however, the transmitting communication device may be unable to determine which detected transmissions are from reflections from its original radar transmission, and which received transmissions are from interference (e.g., ghost targets) or from direct transmissions from interfering devices.

Various aspects of the present disclosure relate to techniques for both interference detection and manipulation implemented at a transmitting radar device. In some examples, the radar device may introduce random periods of silence into sequential radar signaling frames to observe whether interference exists in the received radar frames. For example, the radar device may switch from transmitting radar signaling in every frame to refraining from transmitting radar signals in a random frame in order to observe whether or not it receives a signal during that frame. If the device receives a signal, the device will determine that the received signal is from interference (and not a reflected signal from an original radar transmission).

In some other implementations, the transmitting radar device may implement coordinated interference techniques. For example, the radar device may transmit a request to one or more surrounding devices to request that the devices identify themselves as potential interferers. Upon identifying the potential interferers, the radar device may request that the devices apply a time offset to their respective transmitted frames such that the radar device receives the signals with a predictable frequency shift or range shift. The radar device may be able to determine which transmissions are interference based on receiving transmissions from devices that are shifted in frequency or range as compared to the reflected radar signals, which may not exhibit such shifts.

Aspects of the disclosure are initially described in the context of wireless communications systems. Aspects of the disclosure are further illustrated by and described with reference to apparatus diagrams, system diagrams, processed radar frame outputs, signaling diagrams, a process flow, and flowcharts that relate to closed loop radar interference identification and management.

FIG. 1 illustrates an example of a wireless communications system 100 that supports closed loop radar interference identification and management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless devices (for example, in a V2X wireless system) may implement radar-based signaling to detect nearby targets and to obtain information regarding the surrounding environment. In some examples, a device such as a UE 115 may be equipped with a frequency-modulated continuous wave (FMCW) radar, which broadcasts a number of radar chirps or signals and waits to receive signal reflections from surrounding devices in a received radar frame. A radar frame may include a sequence of a discrete number (e.g., $N_c$) of chirps transmitted by the radar-equipped UE 115. A radar chirp may be a frequency sweep of bandwidth B and duration Tc, (e.g., a signal with an instantaneous frequency that increases linearly with time with a slope S=B/Tc). In some cases, the UE 115 may determine a distance to a target based on a delay between a transmitted and a reflected signal, and the UE 115 may similarly determine the velocity of a target based on a phase shift among received signals across multiple chirps in a frame. In some cases, the UE 115 may utilize multiple antennas to estimate a direction of arrival of the received reflections, and may use this information to determine relative positioning (e.g., angle) of the target.

A radar-equipped UE 115 may implement receiver end processing for FMCW radar signals to determine distance and positioning information of the identified targets. For example, a receiver at the UE 115 may mix the received reflected signal y(t) with the transmitted chirp x(t), and output a signal with an instantaneous frequency that is the difference between transmitted and received signal frequencies. The receiver may pass the mixed signal with temporally constant frequency through a low pass filter, and may sample the filtered signal with a rate of N samples per chirp duration. The receiver may estimate the range and velocity of the target by using a two dimensional fast Fourier transform (FFT) on a data matrix of dimension $N \times N_c$ corresponding to the whole frame of chirps. The UE 115 may implement constant false alarm rate (CFAR) detection to detect peaks in the FFT outputs to distinguish actual targets from noise with a constant false alarm rate.

To increase signaling reliability, the UE 115 may implement a number of different techniques for both interference detection and manipulation. In some examples, the UE 115 may switch from transmitting radar signaling in every frame, to randomly refraining from transmitting a radar signal in a frame (e.g., during a silence interval). If the UE 115 receives a signal, the UE 115 will determine that the received signal is from interference (and not a reflected signal from an original radar transmission).

In some other implementations, the UE 115 may transmit a request to one or more surrounding devices to request that the devices identify themselves as potential interferers. Upon identifying the potential interferers, the UE 115 may request that the devices apply a time offset to their respective transmitted frames such that the UE 115 receives the signals with a predictable frequency shift or range shift. The UE 115 may be able to determine which transmissions are interference based on receiving transmissions from devices that are shifted in frequency or range as compared to the reflected radar signals, which may not exhibit frequency or range shifts.

Figure 2:
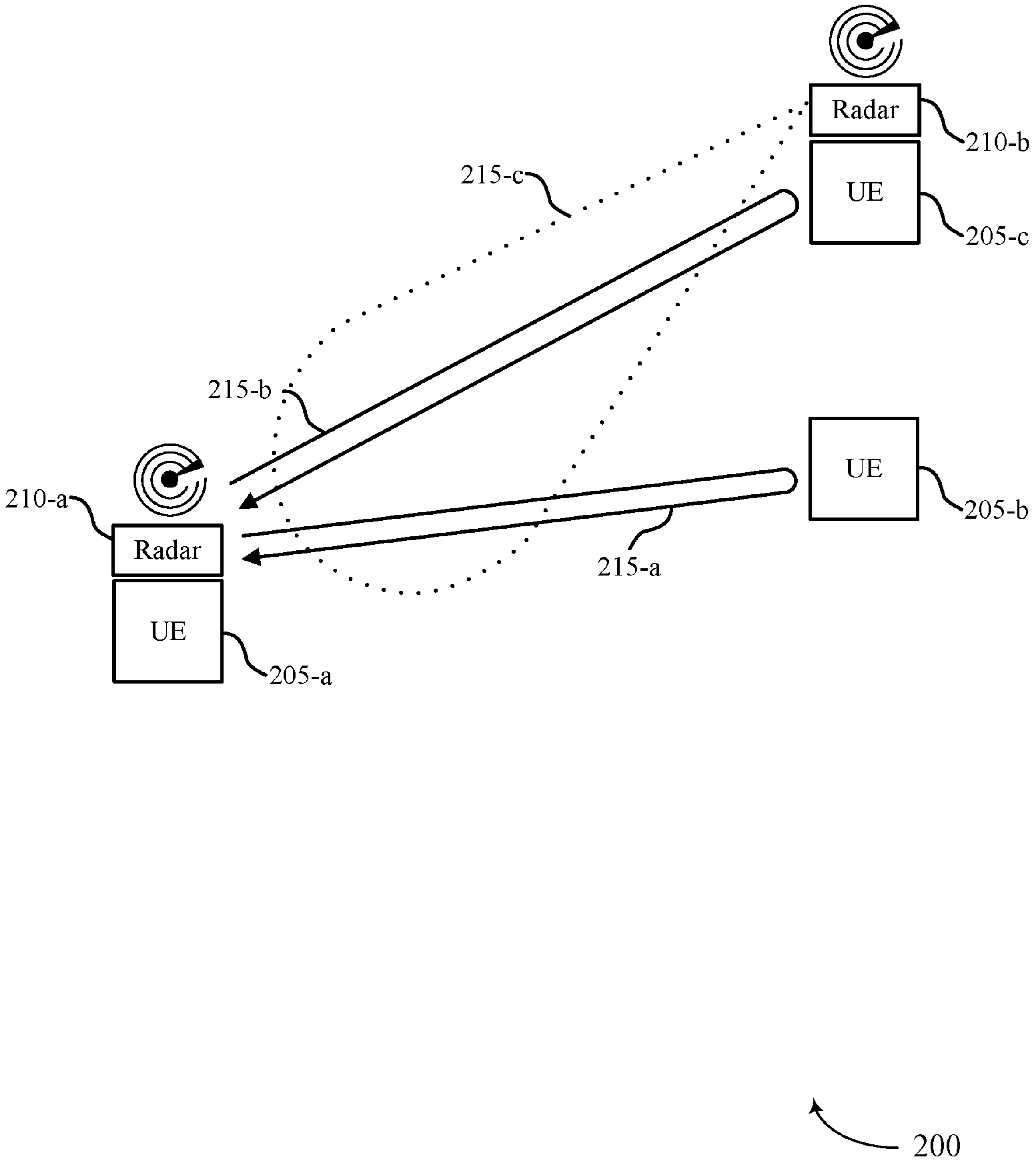

FIG. 2 illustrates an example of a wireless communications system 200 that supports closed loop radar interference identification and management in accordance with aspects of the present disclosure. The wireless communications system 200 may implement or be implemented by one or more aspects of the wireless communications system 100. For example, the wireless communications system 200 may include a UE 205-*a*, a UE 205-*b*, and a UE 205-*c*, which may be examples of corresponding UEs 115 as described with reference to FIG. 1. In the example of FIG. 2, a UE 205 may be configured with one or more radars 210. For example, the UE 205-*a* may be configured with a radar 210-*a* and the UE 205-*c* may be configured with a radar 210-*b*. In some cases, the radars 210 may be examples of FMCW radars.

The radars 210 may transmit and detect signaling 215. For example, the radars 210 may transmit signaling 215 in order to determine properties of nearby targets, which may be other UEs 205 or other potential interfering devices. In some cases, a UE 205 may attempt to measure properties associated with other UEs 205 within the wireless communications system 200. For example, UEs 205 may be examples of vehicles, which may utilize range and speed information associated with other UEs 205 to conduct operations associated with autonomous driving. For example, radar-equipped vehicles may be deployed in dense traffic scenarios with high signaling volume. In some cases, the radar 210-*a* may transmit signaling 215-*a*, which may be reflected by one or more objects such as the UE 205-*b*. In addition, the radar 210-*a* may receive (e.g., detect) the signaling 215-*a* that is reflected by the UE 210-*b*. The radar 210-*a* may determine one or more properties associated with the UE 205-*b* based on the signaling 215-*a*. For example, the radar 210-*a* may measure a duration of time between the transmission of signaling 215-*a* and the detection of signaling 215-*a* at the UE 205-*a* (e.g., after the signaling 215-*a* is reflected by the UE 205-*b*).

The radar 210-*a* or the UE 205-*a* may determine a distance between the UE 205-*b* and the UE 205-*a* based on the measured duration of time. The radar 210-*a* may additionally or alternatively detect signaling 215 directly from other radars 210 (e.g., signaling that is not associated with signaling reflections). For example, the radar 210-*a* may detect signaling 215-*c* from the radar 210-*b*. In some cases, the radar 210-*a* may be unable to differentiate between the signaling 215-*c*, the signaling 215-*b* (e.g., after reflection by the UE 205-*c*), and the signaling 215-*a* (e.g., after reflection by the UE 205-*b*). That is, the radars 210 may not have a provision for operation under interference. For example, the radar 210-*a* and the radar 210-*b* may transmit signaling 215 using a same frequency band. The radar 210-*a* may transmit signaling 215-*b*, which may be reflected by the UE 205-*c*. The radar 210-*b* may transmit signaling 215-*c* in the direction of radar 210-*a*. The signaling 215-*c* may act (e.g., may be detected) as interference at the radar 210-*a*.

In some examples, the signaling 215-*c* may be classified as one or more types of interference. For example. the signaling 215-*c* may be an example of coherent, incoherent, or partially coherent interference. For example, coherent interference occurs when interfering radars (e.g., radars 210-*a* and 210-*b*) use the same parameters such as the same bandwidth and chirp duration, which creates ghost targets (e.g., false alarms) detected by the radar 210-*a*. Incoherent interference may occur when an interfering radar (e.g., radar 210-*b*) uses different waveform parameters than the transmitting radar 210-*a*, which increases the noise floor at the radar 210-*a*, and degrades detection performance. Partially coherent interference may occur due to a relatively slight mismatch in waveform parameters between the transmitting radar 210-*a* and the interfering radar 210-*b*, which may cause ghost peaks spreading in the range-doppler domain, which masks potential targets of the radar 210-*a*.

The radar 210-*a* may receive both the reflected signaling 215-*b* and signaling 215-*c*, which may have a same frequency band. The signaling 215-*c* may increase a broadband noise floor, which may render target detection less reliable for the radar 210-*a*. For example, increased noise floor and interfering signals may prevent a radar from detecting reflected signals, and may experience relatively high levels of uncoordinated interference. To decrease the broadband noise floor, one or more radars may implement coordinated interference. The coordinated interference may include coordinating with a base station or another UE 205 to follow the same parameters of their transmitted FMCW signals. Examples of parameters may include frequency sweep range (e.g., bandwidth) and chirp duration (e.g., chirp period). Although the coordinated interference may reduce the broadband noise floor, interference may appear as one or more ghost targets that may not be differentiable from actual targets. For example, the UE 205-*a* may detect a ghost target associated with the signaling 215-*c*. That is, the UE 205-*a* may detect a ghost target that does not exist, or does not exist in a detected location.

In some examples, the UE 205-*a* may implement a number of different techniques to eliminate or manipulate the received interference. For example, the UE 205-*a* may identify whether or not it's received radar frames are contaminated with interference, and may further identify which detections (e.g., resulting from processed receive radar frames) originate from interference and which are due to reflections of previously transmitted radar signaling. Additionally or alternatively, the UE 205-*a* may manipulate detections due to interference by "pushing" the interference out of a detectable range (e.g., the UE 205-*a* may implement a time offset which eliminates the detected interference), or the UE 205-*a* may use techniques to bring out of band interference in-band.

Figure 3:
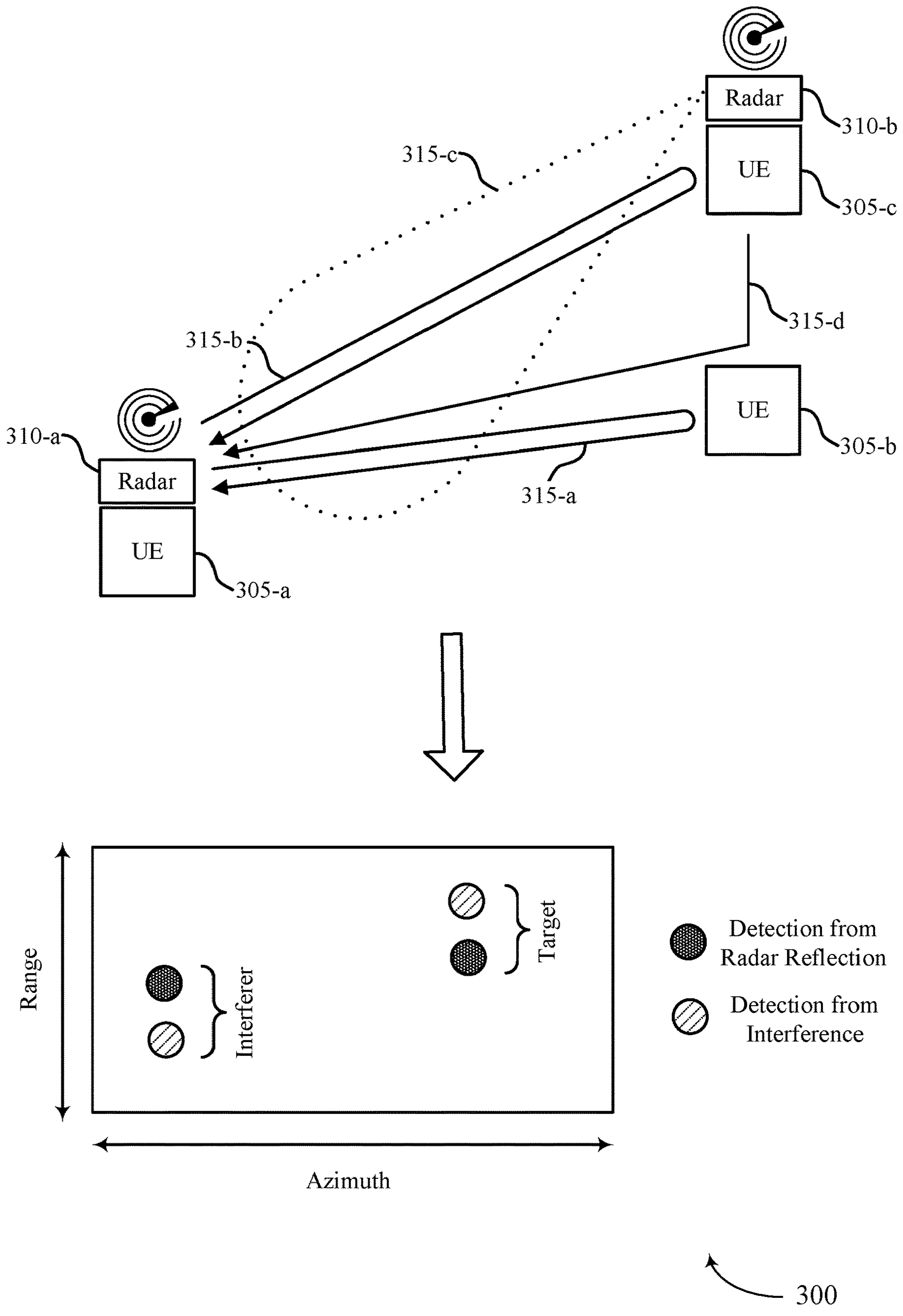
FIGS. 3 and 4 illustrate examples of processed radar frame outputs that support closed loop radar interference identification and management in accordance with aspects of the present disclosure.

FIG. 3 illustrates an example of a wireless communications system and associated processed radar frame output 300 that supports closed loop radar interference identification and management in accordance with aspects of the present disclosure. The processed radar frame output 300 may result from processes occurring at one or more wireless communications devices that support radar communications in a wireless communications system. For example, the wireless communications devices may be examples of corresponding devices described with reference to wireless communications systems 100 and 200. In some cases, the wireless communications system and associated processed radar frame output 300 may include a UE 305-*a*, a UE 305-*b*, and a UE 305-*c*, which may be examples of corresponding UEs as described with reference to FIGS. 1 and 2. In the example of FIG. 3, a UE 305 may be configured with one or more radars 310. For example, the UE 305-*a* may be configured with a radar 310-*a* and the UE 305-*c* may be configured with a radar 310-*b*. In some cases, the radars 310 may be examples of FMCW radars.

The radars 310 may transmit and detect signaling 315. For example, the radars 310 may transmit signaling 315 in order to determine properties of nearby targets, which may be other UEs 305 or other potential interfering devices. In some cases, a UE 305 may attempt to measure properties associated with other UEs 305 within the wireless communications system. For example, UEs 305 may be examples of vehicles, which may utilize range and speed information associated with other UEs 305 to conduct operations associated with autonomous driving.

Due to high signaling traffic in the wireless communications system, the UE 305-*a* and the radar 310-*a* may detect a number of transmissions resulting from reflections from signaling output from the radar 310-*a* (e.g., signaling 315-*b*) in addition to other signals (e.g., 315-*a* and 315-*c*, or other signaling) that may in some cases be interference signals originating from interfering device transmissions (e.g., signaling which follow a signaling path from the interfering device, to the target device, to the radar 310-*a*). In some other cases, the radar 310-*a* may receive direct signaling from an interfering device which are not associated with the original radar signaling from radar 310-*a*.

In some examples, the UE 305-*a* may implement interference identification techniques to process detections from the radar 310-*a* to determine which detections originate from reflections from radar transmissions, and which detections originate from interference. For example, a radar output may be a 2D image representing a processed range-azimuth frame at the radar 310-*a*, where detections originating from radar reflections are separated in range from detections originating from interference. In some other examples, the UE 305-*a* may implement interference manipulation techniques to eliminate detections due to interference or to shift the locations of detections due to interference.

Figure 4:
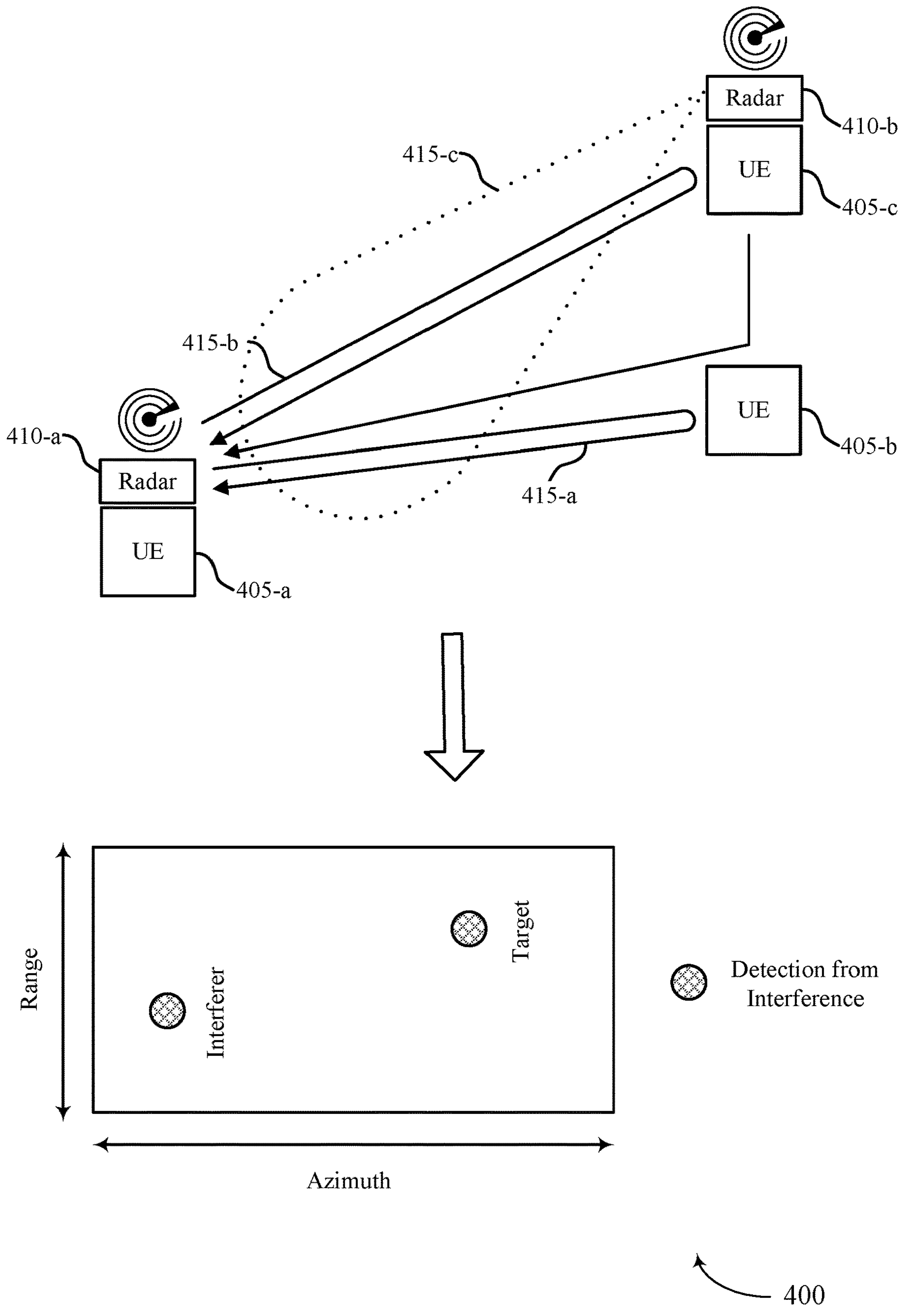

FIG. 4 illustrates an example of a processed radar frame output 400 that supports closed loop radar interference identification and management in accordance with aspects of the present disclosure. The processed radar frame output 300 may result from processes occurring at one or more wireless communications devices that support radar communications in a wireless communications system. For example, the wireless communications devices may be examples of corresponding devices described with reference to wireless communications systems 100 and 200. In some cases, the wireless communications system and associated processed radar frame output 400 may include a UE 405-*a*, a UE 405-*b*, and a UE 405-*c*, which may be examples of corresponding UEs as described with reference to FIGS. 1-3. In the example of FIG. 4, a UE 405 may be configured with one or more radars 410. For example, the UE 405-*a* may be configured with a radar 410-*a* and the UE 405-*c* may be configured with a radar 410-*b*. In some cases, the radars 410 may be examples of FMCW radars.

The radars 410 may transmit and detect signaling 415. For example, the radars 410 may transmit signaling 415 in order to determine properties of nearby targets, which may be other UEs 405 or other potential interfering devices. In some cases, a UE 405 may attempt to measure properties associated with other UEs 405 within the wireless communications system. For example, UEs 405 may be examples of vehicles in a V2X system.

Due to high signaling volume in the wireless communications system, the UE 405-*a* and the radar 410-*a* may detect a number of transmissions resulting from reflections from signaling output from the radar 410-*a* in addition to other signals (e.g., 415-*a* and 415-*c*, or other signaling) that may in some cases be interference signals originating from interfering device transmissions.

In some examples, the UE 405-*a* may implement interference identification techniques to process detections from the radar 410-*a* to determine which detections originate from reflections from radar transmissions, and which detections originate from interference. In some cases, to differentiate between which received signals originate from interference and which received signals originate from reflected radar signaling, the UE 405-*a* and the radar 410-*a* may introduce random silence intervals into a sequence of successive radar frames.

In some cases, the UE 405-*a* may perform interference identification by processing successive radar frames (e.g., back-to-back frames that are successively transmitted in time). In examples that radars in the wireless communication system support coordinated interference (e.g., related to having the same FMCW parameters for radars in the system), the radar 210-*a* may introduce random silence intervals to the successive transmissions such that there are intervals in which the radar 210-*a* does not transmit and listens only. To detect interference, the radar 210-*a* may process received frames received during the silence interval to determine whether any signaling was received during the silence interval. For example, to process the frames received during the silence interval, the UE may mix received signals with a "virtual" transmission waveform (e.g., the waveform that the UE 405-*a* refrains from transmitting during the silence interval. In cases that signaling was received, the UE 405-*a* and radar 210-*a* may determine that those signals originate from interference. Conversely, if the UE 405-*a* processes frames from the radar 410-*a* received during this silence interval and determines that no signaling is present, the UE 405-*a* may determine that no interference exists.

The UE 405-*a* may identify and track interference originating from an interfering device based on information received during silence intervals. For example, the UE 405-*a* may determine a first relative location of the interfering device in a first silence interval, and may compare the first relative location of the interfering device to a second relative location of the interfering device determined for a second silence interval. In some cases, the UE 405-*a* may compare the location of the interferer and a target device using a processed range-azimuth frame of the radar 410-*a*. Upon completing a silence interval, the radar 410-*a* may resume its successive transmission and observes new detections that correspond to its own reflected radar transmissions (in addition to detections that are to be known to be originating from interference).

Figure 5:
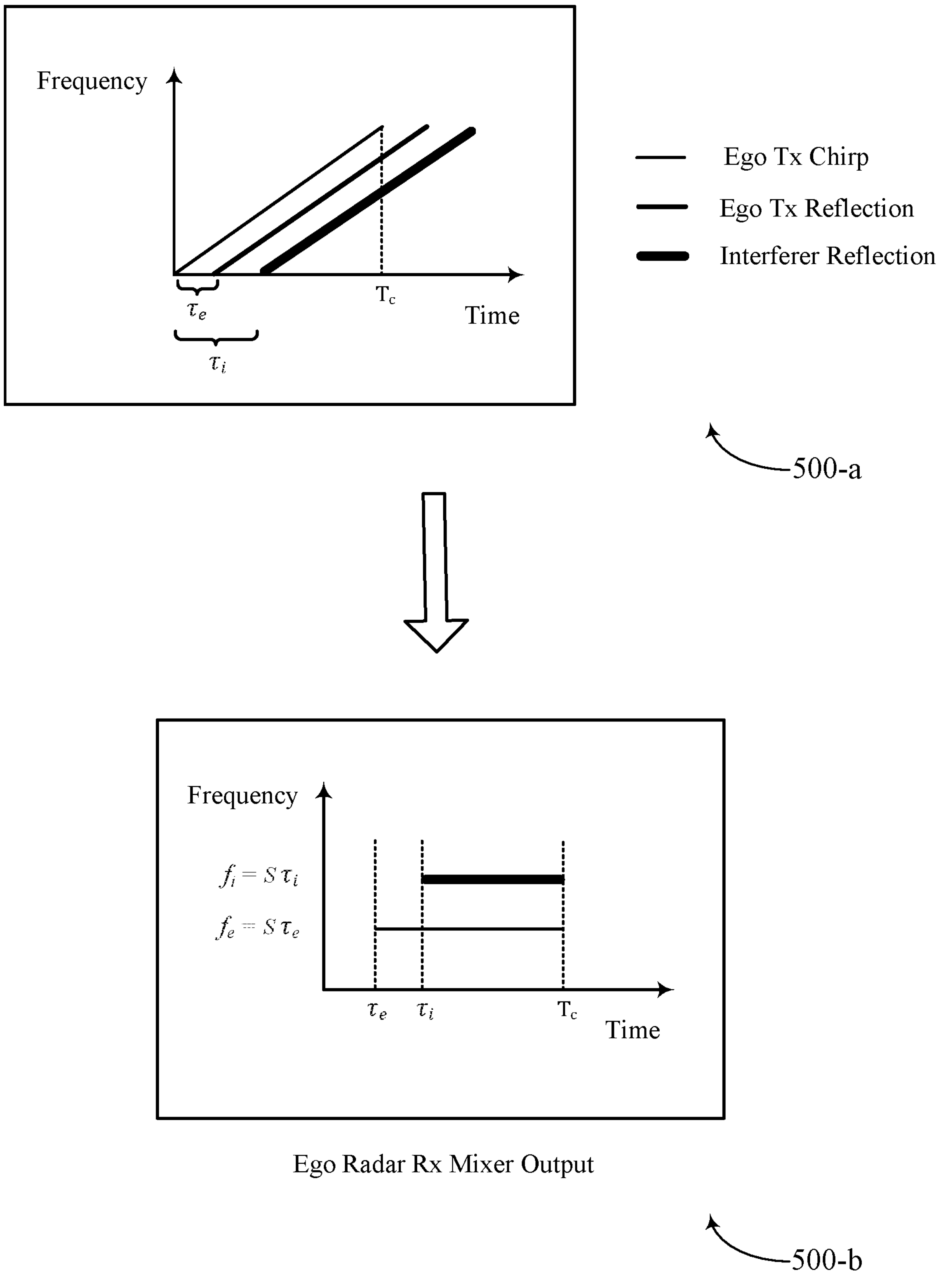
FIGS. 5-7 illustrate example signaling diagrams that support closed loop radar interference identification and management in accordance with aspects of the present disclosure.

FIG. 5 illustrates an example of signaling diagrams 500-*a* and 500-*b* that supports closed loop radar interference identification and management in accordance with aspects of the present disclosure. The signaling diagrams 500-*a* and 500-*b* may implement, or be implemented by aspects of the wireless communications system 100, the wireless communications system 200, or both. The signaling diagrams 500-*a* and 500-*b* may be illustrated by frequency diagrams which may illustrate signaling associated with one or more radars that support feedback-based interference identification. For example, frequency diagram 500-*a* may illustrate a preprocessed frame which includes signaling from an ego radar transmission chirp, a reflection of the ego radar transmission chirp, and an interferer reflection. The frequency diagrams 500-*b* may illustrate a processed frame output by the receiver of the ego radar.

In some cases, a UE may identify interference based on a timing offset between a radar frame associated with the reflected radar transmissions and a radar frame associated with interference. For example, a timing offset between radar reflection and interferer radar frames manifests itself as a spatial translation of detections at radar that are due to interferer's transmissions.

The example of signaling diagrams 500 may include a single chirp duration between an ego radar, an interfering device, and a target device. In 500-*a*, the ego radar receives reflections from the target device, the total round trip delay for the radar signal to propagate between the radar device, the target, and back to the radar device may be expressed as $\tau_e$. The radar may receive another reflection due to a path from the interferer device, to the target device, and back to the ego, which has a delay $\tau_i$, where $\tau_i=\tau_p+\tau_o$, $\tau_p$ is the propagation time and $\tau_o$ is the timing offset between ego and interferer radar frames with respect to ego-radar time reference. $\tau_o$ can be either positive or negative.

In 500-*b*, a change in timing offset $\tau_o$ translates to a change in generated beat frequency $f_i$ and results in a spatial translation on the range axis of ego radar detections, with a one-to one correspondence between beat frequency and range. For example, the interferer reflection may be expressed by $f_i=S\ \tau_i$, where S is the chirp slot (e.g., bandwidth or chirp duration), and the target reflection may be expressed by $f_e=S\ \tau_e$. Using the ego radar receiver mixer output, a UE may identify the interference by observing the frequency shift as a spatial translation on the range axis.

Figure 6:
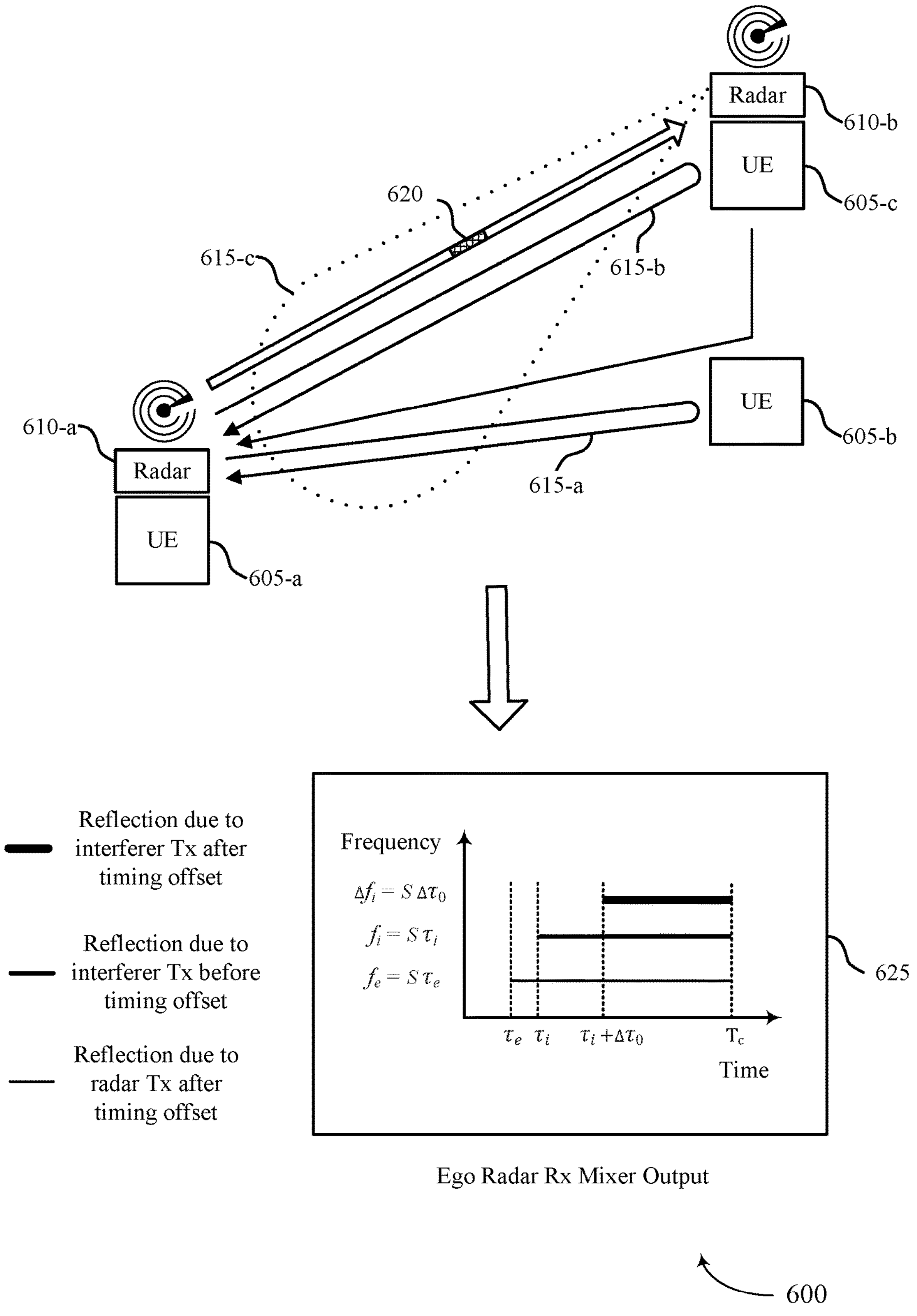

FIG. 6 illustrates an example of a signaling diagram 600 that supports closed loop radar interference identification and management in accordance with aspects of the present disclosure. The processed receiver output 625 may result from processes occurring at one or more wireless communications devices that support radar communications in a wireless communications system. For example, the wireless communications devices may be examples of corresponding devices described with reference to wireless communications systems 100 and 200. In some cases, the wireless communications system and radar receiver output may include a UE 605-*a*, a UE 605-*b*, and a UE 605-*c*, which may be examples of corresponding UEs as described with reference to FIGS. 1-4.

The radars 610 may transmit and detect signaling 615. For example, the radars 610 may transmit signaling 615 in order to determine properties of nearby targets, which may be other UEs 605 or other potential interfering devices. In some cases, a UE 605 may attempt to measure properties associated with other UEs 605.

Due to high signaling volume in the wireless communications system, the UE 605-*a* and the radar 610-*a* may detect a number of transmissions resulting from reflections from signaling output from the radar 610-*a* in addition to other signals (e.g., 615-*a* and 615-*c*, or other signaling) that may in some cases be interference signals originating from interfering device transmissions. In some examples, the UE 605-*a* may implement feedback based interference identification to identify which detections are generated by interference, and which detections are reflections of original chirps transmitted by the radar 610-*a*. For example, in some cases, a frame time offset may be introduced between ego radar and interference frames such that the interference is expressed with a range shift in the receiver output of the UE.

For example, if the frame timing between the ego radar 610-*a* and interferer changes (e.g., by $\Delta\tau_o$) this change may be reflected as a shift in range that is equal to $$\Delta d = \frac{c\Delta\tau_o}{2}$$

for the corresponding interference-generated detection (where c is the speed of light). In such examples, the ego radar 610-*a* may identify the detections that experience the predicted range shifts between successive frames as interference, and the ego radar 610-*a* may identify other detections as originating from reflections of ego transmissions.

In some cases, the ego radar 610-*a* changes its frame timing with a given value or time shift. In some other cases, the ego radar 610-*a* may transmit a request that other potential interfering devices apply a timing advance or delay to their respective radar frames. For example, the ego radar 610-*a* identifies a number of potential interfering devices, or the ego radar 610-*a* receives a transmission from surrounding devices which identifies the devices as potential interferers. For example, when the UE 605-*a* is operating without network coverage (e.g., in a standalone deployment), the UE 605-*a* broadcasts a sidelink signal (e.g., a CV2X signal) with a request that any other UE or vehicle that identifies itself as an interferer applies the requested time offset. In some cases, a vehicle may identify itself as interferer based on a number of different criteria such as relative distance from the interferer to the ego radar, overlapping field of view with the ego radar, among other spatial or signaling characteristics. In some examples, the potential interfering device may identify information about the ego radar 610-*a* based on information in the broadcast message. For example, position of the ego-radar is available as a zone ID in sidelink control information, which may be transmitted as at least part of the broadcast signal.

A device that identifies itself as a potential interferer inform the ego radar 610-*a* by establishing a unicast CV2X link (e.g., mode 2 CV2X) with the ego radar 610-*a* such that the ego radar 610-*a* may identify interferers and establish unicast connections with the interferers in the future. In some other cases, the ego radar 210-*a* may be aware of the identity of interferers. In such cases, the ego radar 610-*a* may transmit a group-cast CV2X signal with the requested time offset. In some examples, the ego radar 610-*a* may transmit different time offsets to different interfering devices (e.g., different time offsets per UE-ID), or the ego radar 610-*a* may transmit the same time offset. In some other cases that the UE 605-*a* is operating under network coverage, the UE 605-*a* may broadcast the request 620 to modify the time offset to potential interferer devices using resources allocated by the network (e.g., mode-1 CV2X).

By transmitting a request for applying a timing offset for other device, the ego radar 610-*a* may effectively identify and track interference from interfering devices. Additionally or alternatively, the ego radar 610-*a* may manipulate or adjust the interference based on transmitting requests for different timing offsets.

Figure 7:
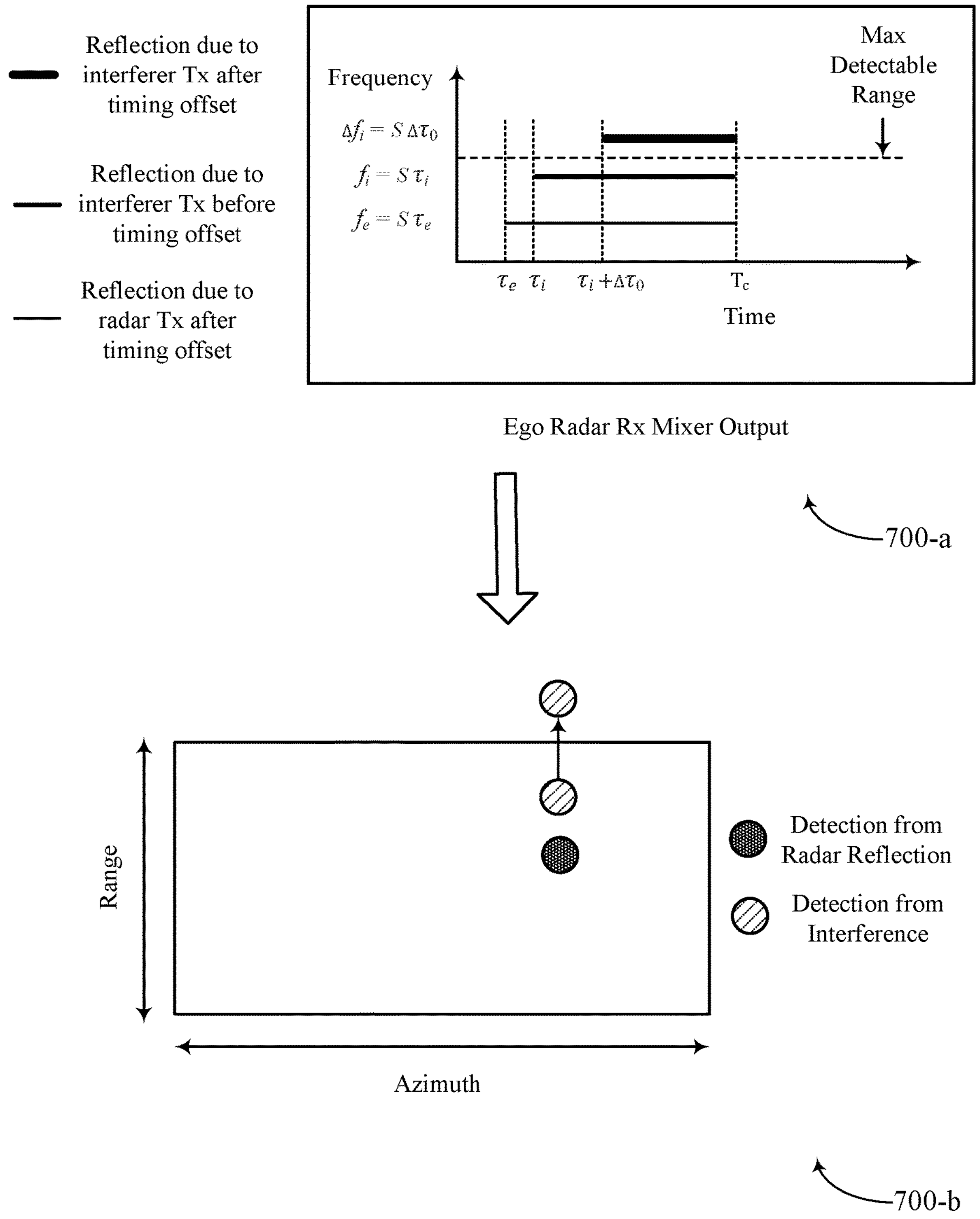

FIG. 7 illustrates an example of a signaling diagram 700 that supports closed loop radar interference identification and management in accordance with aspects of the present disclosure. The signaling diagrams 700-*a* and 700-*b* may implement, or be implemented by aspects of the wireless communications system 100, the wireless communications system 200, or both. The signaling diagrams 700-*a* may be a frequency diagram which may illustrate signaling associated with one or more radars that support feedback-based interference manipulation. The signaling diagram 700-*b* may be a processed range-azimuth frame output by the receiver of the radar. For example, frequency diagram 700-*a* may illustrate a pre-processed frame which includes signaling from reflection due to the ego radar transmission, the reflection due to an interfering device, and the reflection of the interfering device after applying a timing offset. The frequency diagram 700-*b* may illustrate a processed frame output by the receiver of the ego radar.

In some cases, a UE may identify interference based on a timing offset between a radar frame associated with the reflected radar transmissions and a radar frame associated with interference. For example, a timing offset between radar reflection and interferer radar frames may be a spatial translation of detections at radar that are due to interferer's transmissions.

In some cases, a UE that is aware of detections that are interference based may use different timing advances or delays to manipulate or shift detections due to interference outside of a detectable range. For example, in some cases, the applying the timing advance or delay may eliminate or reduce interference by shifting the beat frequency associated with the interference outside the passband of a low pass filter associated with the radar such that the interference resembles out of range targets.

In some other examples, the UE may receive additional information on targets due to interference and the timing advance or delay. For example, the UEs perception of the surrounding environment may be enhanced due to interference detection and manipulations. Additionally or alternatively, the UE may align multiple detections on co-visible targets by both the ego radar at the UE and interfering devices for higher localization accuracy.

In some examples, out of range reflections from targets due to interference may be brought in range based on interfering devices applying a timing advance or delay. For example, if a detection from a co-operating radar is observed by the UE to be moving outside of detection range, feedback can be used to "push" the detection within range. In some other cases, (e.g., in the examples of 500-*a* and 500-*b*) a timing advance or delay may be applied to push the interference detection outside of a detectable range of the ego radar. For example, in 700-*a*, the reflection due to the interfering device transmission after the timing offset is shifted outside of the detectable range of the ego radar. In 700-*b*, the detection from interference is shifted outside of the range window.

In cases that the UE is aware of the IDs of the interfering devices, the UE may transmit a time offset indication via a groupcast message (e.g., groupcast CV2X message) or a unicast message (e.g., a unicast CV2X message). In some examples, the UE may update the time offset indication using a pre-configured period or in accordance with an updating pattern. For example, the UE may support semi-persistent scheduling (SPS) transmissions and resource reservation procedures to pre-reserve a set of resources occurring periodically that the UE may use for transmitting updates to the time offset indication. In some examples, each SPS transmission may indicate the SPS period and a next reserved resource. In some other examples, the ego-radar may interrupt SPS transmissions and send a message before waiting for the next period.

The UE may apply techniques described herein to reduce the detected interference associated with radar signaling, which may effectively increase reliability and overall signaling quality in a wireless communications system employing high signaling traffic.

Figure 8:
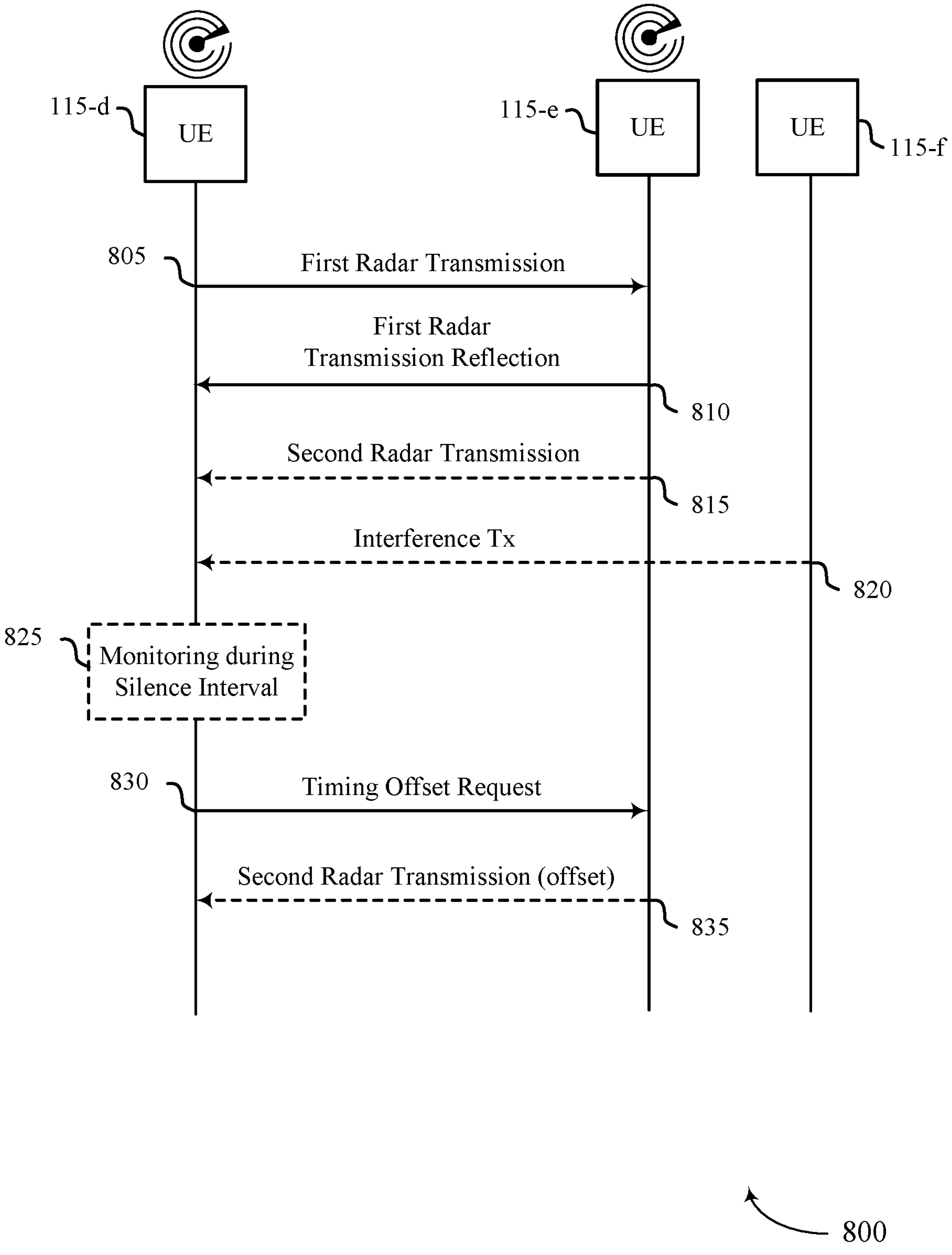
FIG. 8 illustrates an example of a process flow that supports closed loop radar interference identification and management in accordance with aspects of the present disclosure.

FIG. 8 illustrates an example of a process flow 800 that supports closed loop radar interference identification and management in accordance with aspects of the present disclosure. The process flow 800 may implement aspects of wireless communications systems 100 and 200, or may be implemented by aspects of the wireless communications system 100 and 200. For example, the process flow 800 may illustrate operations between radar equipped wireless devices which may be UEs 115-*e* and 115-*f*, which may be examples of corresponding devices described with reference to FIGS. 1-7. In the following description of the process flow 800, the operations between the UE 115-*e* and 115-*f* may be transmitted in a different order than the example order shown, or the operations performed by the UE 115-*e* and 115-*f* may be performed in different orders or at different times or by different devices. Additionally or alternatively, some operations may also be omitted from the process flow 800, and other operations may be added to the process flow 800. In addition, while process flow 800 illustrates operations between UEs, the described processes may be implemented at different wireless devices.

At 805, the UE 115-*d* may transmit a first radar signal (e.g., in accordance with a radar transmission configuration) in a first frame over a time duration to a number of target devices.

At 810, the UE 115-*d* may receive, in a second frame of the time duration, a first reflected signal corresponding to the first radar signal. Additionally or alternatively, the UE 115-*d* may receive a number of different transmissions in response to the first radar signal. For example, the UE 115-*d* may receive a second radar transmission at 815 (e.g., transmitted from the UE 115-*e*), or one or more additional transmissions at 810 from additional UEs in the system (e.g., UE 115-*f*) which in some cases may be interference transmissions.

At 825, the UE 115-*d* may optionally monitor a third frame that is subsequent to the first frame and the second frame for one or more interfering signals during a silence interval of the time duration, the silence interval associated with an absence of transmissions by the UE 115-*d*. For example, the UE 115-*d* may introduce the silence interval between successive radar frame transmissions to monitor for interference from other wireless devices. In some examples, the UE 115-*d* may determine an absence of interference at the first wireless device based at least in part on an absence of one or more interfering signals received during the silence interval.

In some other examples, the UE 115-*d* may detect interference based on receiving the one or more interfering signals during the silence interval of the time duration. The UE 115-*d* may mix the one or more interfering signals with a virtual waveform associated with the first radar transmission. In some cases, the UE 115-*d* may transmit and additional radar signal in a fourth frame, and may receive a second reflected signal. The UE 115-*d* may then track the interference associated with the one or more interfering signals identified in the first frame.

In some examples in which the UE 115-*d* identifies interference associated with the one or more additional received signals, the UE 115-*d* may transmit, at 830, to the UE 115-*e*, a request to modify a timing offset (e.g., a timing advance or a timing delay) for the second transmission in a second frame by the UE 115-*e*. The UE 115-*e* may transmit the request using control signaling (e.g., in a sidelink control information (SCI) message which includes positioning information for the UE 115-*e*). In some cases, the timing offset may correspond to a range shift for the second transmission received by the UE 115-*d*. Based on the observed range shift, the UE 115-*d* may be able to determine whether the second transmission is a reflected signal corresponding to the transmitted first radar signal or whether the second transmission is interfering transmission. In some examples, the time-shifted second transmission may correspond to a change in generated beat frequency of the second transmission relative to the first transmission that is further associated with the range shift.

In some examples, the request to modify the timing offset further includes a request for the UEs 115-*e* and 115-*f* to identify themselves as interfering devices based on a distance between a relative distance of the UE 115-*d*, a field of view overlap, position information in SCI, or any combination thereof. In some cases, the UE 115-*d* may establish one or more unicast links with the UEs 115-*e* and 115-*f* based on whether the UEs 115-*e* and 115-*f* are potential interferers.

For example, the UE 115-*e* may identify itself as a potential interfering device and may notify the UE 115-*d*. The UE 115-*d* may then modify the timing offset for the second transmission based on identifying the UE 115-*e* as a potential interfering device. In some cases, the UE 115-*d* may transmit the timing offset request in a broadcast message (or in separate unicast messages) to both the UEs 115-*e* and 115-*f* where the message may include the same or different timing offsets for the UEs 115-*e* and 115-*f* to apply.

In some examples, the UE 115-*d* may determine that the second transmission is within a detectable range of the second frame, and the UE 115-*d* may determine a value for the timing offset which shifts the measured range of the second transmission outside of the detectable range of the second frame. In some other examples, the UE 115-*d* may determine that the second transmission is outside the detectable range of the second frame, and the UE 115-*d* may determine a value for the timing offset which shifts the measured range of the second transmission inside of the detectable range of the second frame.

In some examples, the UE 115-*d* may support SPS scheduling for transmitting the timing offset. For example, the UE 115-*d* may transmit the request to modify the timing offset for the second transmission in accordance with an SPS configuration using a set of periodic resources for transmitting the request. In some cases, the UE 115-*d* may transmit updates to the request using resources of the SPS configuration, or using resources outside of the SPS configuration.

Figure 9:
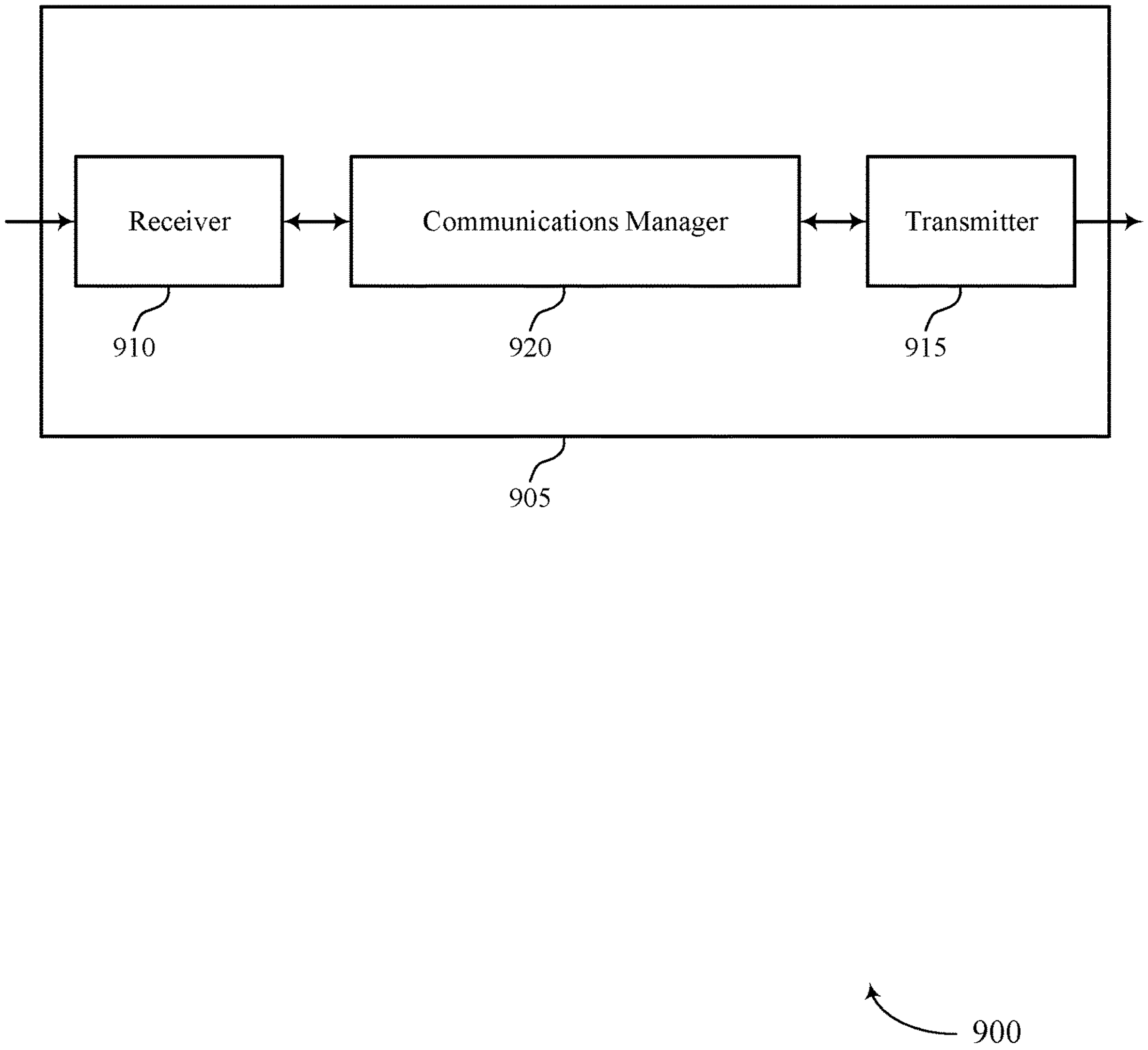
FIGS. 9 and 10 show block diagrams of devices that support closed loop radar interference identification and management in accordance with aspects of the present disclosure.

FIG. 9 shows a block diagram 900 of a device 905 that supports closed loop radar interference identification and management in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to closed loop radar interference identification and management). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to closed loop radar interference identification and management). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of closed loop radar interference identification and management as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first wireless device in accordance with examples as disclosed herein. For example, the communications manager 920 may be configured as or otherwise support a means for transmitting a first radar signal in a first frame over a time duration. The communications manager 920 may be configured as or otherwise support a means for receiving, in a second frame of the time duration, a first reflected signal corresponding to the transmitted first radar signal. The communications manager 920 may be configured as or otherwise support a means for monitoring a third frame that is subsequent to the first frame and the second frame for one or more interfering signals during a silence interval of the time duration, the silence interval associated with an absence of transmissions by the first wireless device.

Additionally or alternatively, the communications manager 920 may support wireless communications at a first wireless device in accordance with examples as disclosed herein. For example, the communications manager 920 may be configured as or otherwise support a means for transmitting, at a first time in a first frame, a first radar signal according to a radar transmission configuration for radar transmissions for the first wireless device. The communications manager 920 may be configured as or otherwise support a means for receiving, in the first frame in response to the first radar signal, a set of multiple transmissions including one or more signal reflections and at least a second transmission from a second wireless device. The communications manager 920 may be configured as or otherwise support a means for transmitting, to the second wireless device, a request to modify a timing offset for the second transmission in a second frame by the second wireless device, the timing offset corresponding to a range shift for the second transmission received by the first wireless device. The communications manager 920 may be configured as or otherwise support a means for receiving, in accordance with the timing offset in the second frame, the second transmission from the second wireless device based on the request.

Additionally or alternatively, the communications manager 920 may support wireless communications at a second wireless device in accordance with examples as disclosed herein. For example, the communications manager 920 may be configured as or otherwise support a means for receiving, at a first time in a first frame, a first radar signal from a first wireless device. The communications manager 920 may be configured as or otherwise support a means for transmitting, in response to receiving the first radar signal, a first transmission to the first wireless device in the first frame. The communications manager 920 may be configured as or otherwise support a means for receiving, from the first wireless device, a request to modify a timing offset for a second transmission by the second wireless device, the timing offset corresponding to a range shift for the second transmission to be received by the first wireless device. The communications manager 920 may be configured as or otherwise support a means for transmitting, in accordance with the timing offset in a second frame, the second transmission to the first wireless device based on the request.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources, reduced impacts of interference, and increased signaling reliability.

Figure 10:
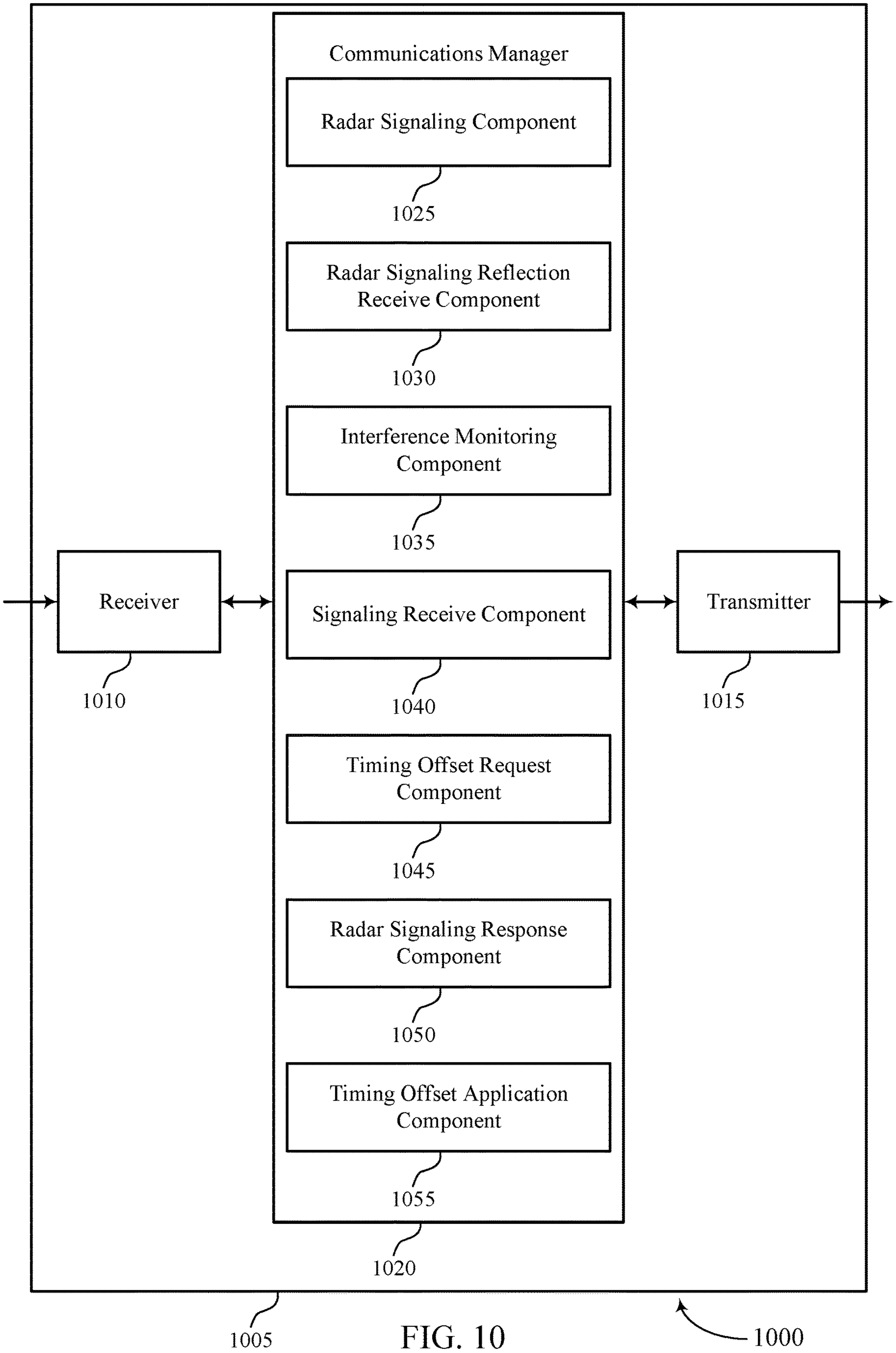

FIG. 10 shows a block diagram 1000 of a device 1005 that supports closed loop radar interference identification and management in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to closed loop radar interference identification and management). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to closed loop radar interference identification and management). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of closed loop radar interference identification and management as described herein. For example, the communications manager 1020 may include a radar signaling component 1025, a radar signaling reflection receive component 1030, an interference monitoring component 1035, a signaling receive component 1040, a timing offset request component 1045, a radar signaling response component 1050, a timing offset application component 1055, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first wireless device in accordance with examples as disclosed herein. The radar signaling component 1025 may be configured as or otherwise support a means for transmitting a first radar signal in a first frame over a time duration. The radar signaling reflection receive component 1030 may be configured as or otherwise support a means for receiving, in a second frame of the time duration, a first reflected signal corresponding to the transmitted first radar signal. The interference monitoring component 1035 may be configured as or otherwise support a means for monitoring a third frame that is subsequent to the first frame and the second frame for one or more interfering signals during a silence interval of the time duration, the silence interval associated with an absence of transmissions by the first wireless device.

Additionally or alternatively, the communications manager 1020 may support wireless communications at a first wireless device in accordance with examples as disclosed herein. The radar signaling component 1025 may be configured as or otherwise support a means for transmitting, at a first time in a first frame, a first radar signal according to a radar transmission configuration for radar transmissions for the first wireless device. The signaling receive component 1040 may be configured as or otherwise support a means for receiving, in the first frame in response to the first radar signal, a set of multiple transmissions including one or more signal reflections and at least a second transmission from a second wireless device. The timing offset request component 1045 may be configured as or otherwise support a means for transmitting, to the second wireless device, a request to modify a timing offset for the second transmission in a second frame by the second wireless device, the timing offset corresponding to a range shift for the second transmission received by the first wireless device. The signaling receive component 1040 may be configured as or otherwise support a means for receiving, in accordance with the timing offset in the second frame, the second transmission from the second wireless device based on the request.

Additionally or alternatively, the communications manager 1020 may support wireless communications at a second wireless device in accordance with examples as disclosed herein. The signaling receive component 1040 may be configured as or otherwise support a means for receiving, at a first time in a first frame, a first radar signal from a first wireless device. The radar signaling response component 1050 may be configured as or otherwise support a means for transmitting, in response to receiving the first radar signal, a first transmission to the first wireless device in the first frame. The timing offset request component 1045 may be configured as or otherwise support a means for receiving, from the first wireless device, a request to modify a timing offset for a second transmission by the second wireless device, the timing offset corresponding to a range shift for the second transmission to be received by the first wireless device. The timing offset application component 1055 may be configured as or otherwise support a means for transmitting, in accordance with the timing offset in a second frame, the second transmission to the first wireless device based on the request.

Figure 11:
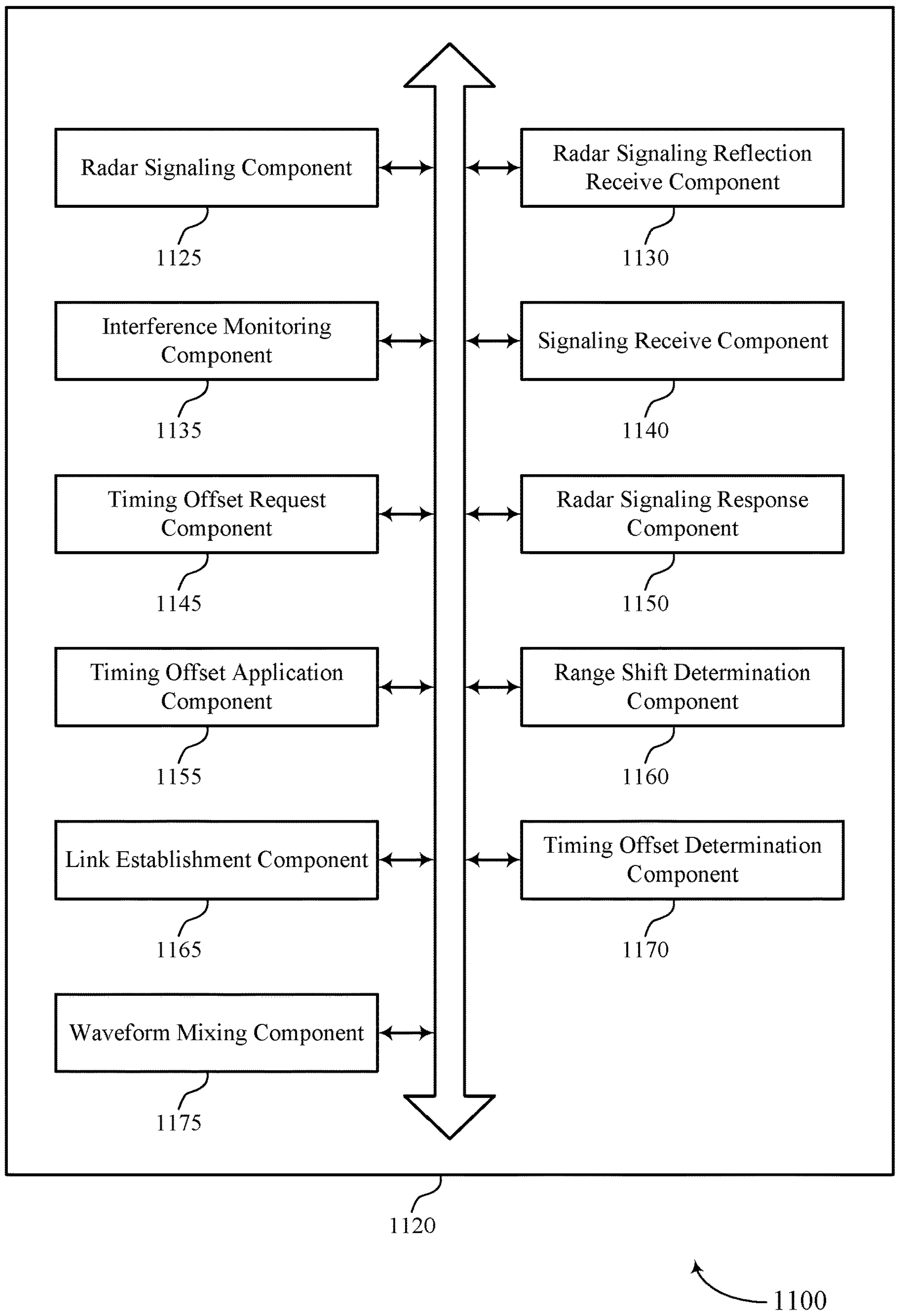
FIG. 11 shows a block diagram of a communications manager that supports closed loop radar interference identification and management in accordance with aspects of the present disclosure.

FIG. 11 shows a block diagram 1100 of a communications manager 1120 that supports closed loop radar interference identification and management in accordance with aspects of the present disclosure. The communications manager 1120 may be an example of aspects of a communications manager 920, a communications manager 1020, or both, as described herein. The communications manager 1120, or various components thereof, may be an example of means for performing various aspects of closed loop radar interference identification and management as described herein. For example, the communications manager 1120 may include a radar signaling component 1125, a radar signaling reflection receive component 1130, an interference monitoring component 1135, a signaling receive component 1140, a timing offset request component 1145, a radar signaling response component 1150, a timing offset application component 1155, a range shift determination component 1160, a link establishment component 1165, a timing offset determination component 1170, a waveform mixing component 1175, or any combination thereof. Each of these components may communicate, directly or indirectly, with one another (e.g., via one or more buses).

The communications manager 1120 may support wireless communications at a first wireless device in accordance with examples as disclosed herein. The radar signaling component 1125 may be configured as or otherwise support a means for transmitting a first radar signal in a first frame over a time duration. The radar signaling reflection receive component 1130 may be configured as or otherwise support a means for receiving, in a second frame of the time duration, a first reflected signal corresponding to the transmitted first radar signal. The interference monitoring component 1135 may be configured as or otherwise support a means for monitoring a third frame that is subsequent to the first frame and the second frame for one or more interfering signals during a silence interval of the time duration, the silence interval associated with an absence of transmissions by the first wireless device.

In some examples, the interference monitoring component 1135 may be configured as or otherwise support a means for detecting interference at the first wireless device based on the monitoring, where the interference is detected based on receiving the one or more interfering signals during the silence interval of the time duration.

In some examples, to support detecting the one or more interfering signals at the first wireless device, the waveform mixing component 1175 may be configured as or otherwise support a means for mixing the one or more interfering signals with a virtual waveform, where the virtual waveform is based on the first radar signal transmitted in the first frame.

In some examples, the radar signaling component 1125 may be configured as or otherwise support a means for transmitting a second radar signal in a fourth frame. In some examples, the radar signaling reflection receive component 1130 may be configured as or otherwise support a means for receiving a second reflected signal based on tracking the interference from the one or more interfering signals by the first wireless device, where the one or more interfering signals are different from the second reflected signal corresponding to the second radar signal.

In some examples, the interference monitoring component 1135 may be configured as or otherwise support a means for determining an absence of interference at the first wireless device based on an absence of one or more interfering signals received during the silence interval.

Additionally or alternatively, the communications manager 1120 may support wireless communications at a first wireless device in accordance with examples as disclosed herein. In some examples, the radar signaling component 1125 may be configured as or otherwise support a means for transmitting, at a first time in a first frame, a first radar signal according to a radar transmission configuration for radar transmissions for the first wireless device. The signaling receive component 1140 may be configured as or otherwise support a means for receiving, in the first frame in response to the first radar signal, a set of multiple transmissions including one or more signal reflections and at least a second transmission from a second wireless device. The timing offset request component 1145 may be configured as or otherwise support a means for transmitting, to the second wireless device, a request to modify a timing offset for the second transmission in a second frame by the second wireless device, the timing offset corresponding to a range shift for the second transmission received by the first wireless device. In some examples, the signaling receive component 1140 may be configured as or otherwise support a means for receiving, in accordance with the timing offset in the second frame, the second transmission from the second wireless device based on the request.

In some examples, the range shift determination component 1160 may be configured as or otherwise support a means for determining whether the second transmission is a reflected signal corresponding to the transmitted first radar signal or whether the second transmission is interfering transmission based on the range shift.

In some examples, to support receiving the set of multiple transmissions and the second transmission, the signaling receive component 1140 may be configured as or otherwise support a means for receiving the second transmission in accordance with the timing offset, the timing offset corresponding to a change in a generated beat frequency relative to a first transmission, the change in the generated beat frequency further associated with the range shift.

In some examples, the timing offset request component 1145 may be configured as or otherwise support a means for transmitting the request to modify the timing offset in a sidelink control information message, where the sidelink control information message further includes a field which identifies position information of the first wireless device.

In some examples, the request to modify the timing offset further includes a request for the second wireless device to identify itself as an interfering device based on a distance between the first wireless device and the second wireless device, and the link establishment component 1165 may be configured as or otherwise support a means for establishing a unicast link with the second wireless device based on the second wireless device being identified as the interfering device.

In some examples, the interference monitoring component 1135 may be configured as or otherwise support a means for identifying the second wireless device is a interfering wireless device associated with the first radar signal. In some examples, the timing offset request component 1145 may be configured as or otherwise support a means for modifying the timing offset associated with transmitting the first transmission or receiving the second transmission at the first wireless device based on the identifying.

In some examples, the request to modify the timing offset is a broadcast message transmitted to the second wireless device and at least a third wireless device, and the timing offset request component 1145 may be configured as or otherwise support a means for transmitting the request to modify the timing offset to the second wireless device and the third wireless device, where the timing offset is the same or different for both the second wireless device and the third wireless device.

In some examples, a range of the second transmission is within a detectable range of the second frame, and the timing offset determination component 1170 may be configured as or otherwise support a means for determining a value for the timing offset which shifts the measured range of the second transmission outside of the detectable range of the second frame. In some examples, a range of the second transmission is within a detectable range of the second frame, and the timing offset request component 1145 may be configured as or otherwise support a means for transmitting, to the second wireless device, the request to modify the timing offset to the determined value to shift the measured range of the second transmission.

In some examples, the measured range of the second transmission is outside a detectable range of the second frame, and the timing offset determination component 1170 may be configured as or otherwise support a means for determining a value for the timing offset which shifts the measured range of the second transmission within the detectable range of the second frame. In some examples, the measured range of the second transmission is outside a detectable range of the second frame, and the timing offset request component 1145 may be configured as or otherwise support a means for transmitting, to the second wireless device, the request to modify the timing offset to the determined value to shift the measured range of the second transmission.

In some examples, the timing offset request component 1145 may be configured as or otherwise support a means for transmitting the request to modify the timing offset for the second transmission in a unicast message to the second wireless device or in a groupcast message to the second wireless device and at least one other additional wireless device.

In some examples, the timing offset request component 1145 may be configured as or otherwise support a means for transmitting the request to modify the timing offset for the second transmission in accordance with a semi-persistent scheduling configuration, where the first wireless device reserves a set of periodic resources for transmitting the request.

In some examples, the timing offset request component 1145 may be configured as or otherwise support a means for identifying one or more updates to the request outside of the set of periodic resources of the semi-persistent scheduling configuration. In some examples, the timing offset request component 1145 may be configured as or otherwise support a means for transmitting the one or more updates to the request using resources outside of the semi-persistent scheduling configuration.

In some examples, the timing offset includes a timing advance or a timing delay relative to a timing of the first frame.

Additionally or alternatively, the communications manager 1120 may support wireless communications at a second wireless device in accordance with examples as disclosed herein. In some examples, the signaling receive component 1140 may be configured as or otherwise support a means for receiving, at a first time in a first frame, a first radar signal from a first wireless device. The radar signaling response component 1150 may be configured as or otherwise support a means for transmitting, in response to receiving the first radar signal, a first transmission to the first wireless device in the first frame. In some examples, the timing offset request component 1145 may be configured as or otherwise support a means for receiving, from the first wireless device, a request to modify a timing offset for a second transmission by the second wireless device, the timing offset corresponding to a range shift for the second transmission to be received by the first wireless device. The timing offset application component 1155 may be configured as or otherwise support a means for transmitting, in accordance with the timing offset in a second frame, the second transmission to the first wireless device based on the request.

In some examples, to support transmitting the second transmission to the first wireless device, the timing offset application component 1155 may be configured as or otherwise support a means for transmitting the second transmission in accordance with the timing offset, the timing offset corresponding to a change in a generated beat frequency relative to the first transmission, the change in the generated beat frequency further associated with the range shift.

In some examples, the timing offset request component 1145 may be configured as or otherwise support a means for receiving the request to modify the timing offset in a sidelink control information message, where the sidelink control information message further includes a field which identifies position information of the first wireless device.

In some examples, the request to modify the timing offset further includes a request for the second wireless device to identify itself as an interfering device based on a distance between the first wireless device and the second wireless device, and the link establishment component 1165 may be configured as or otherwise support a means for establishing a unicast link with the first wireless device based on the first wireless device being identified as the interfering device.

In some examples, the timing offset request component 1145 may be configured as or otherwise support a means for receiving the timing offset associated with transmitting the second transmission to the first wireless device based on the second wireless device being an interfering wireless device.

In some examples, the request to modify the timing offset is a broadcast message transmitted by the first wireless device to the second wireless device and at least a third wireless device, and the timing offset request component 1145 may be configured as or otherwise support a means for receiving the request to modify the timing offset, where the timing offset is the same or different for both the second wireless device and the third wireless device.

In some examples, the timing offset request component 1145 may be configured as or otherwise support a means for receiving, from the first wireless device in a unicast message or in a groupcast message, the request to modify the timing offset for the second transmission.

In some examples, the timing offset request component 1145 may be configured as or otherwise support a means for receiving the request to modify the timing offset for the second transmission on a set of periodic resources in accordance with a semi-persistent scheduling configuration.

In some examples, the timing offset request component 1145 may be configured as or otherwise support a means for receiving one or more updates to the request using resources outside of the semi-persistent scheduling configuration.

In some examples, the timing offset includes a timing advance or a timing delay relative to a timing of the first frame.

Figure 12:
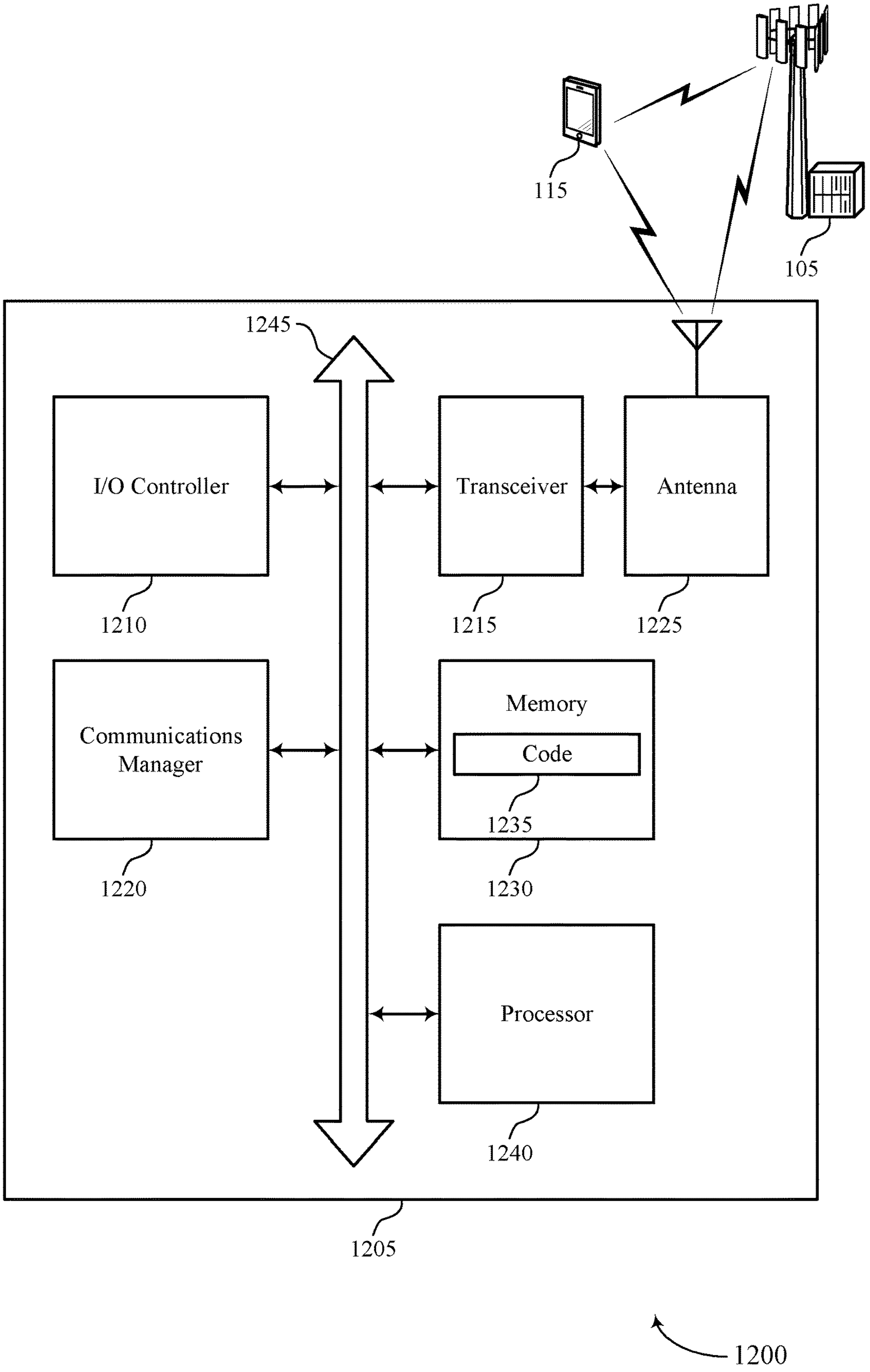
FIG. 12 shows a diagram of a system including a device that supports closed loop radar interference identification and management in accordance with aspects of the present disclosure.

FIG. 12 shows a diagram of a system 1200 including a device 1205 that supports closed loop radar interference identification and management in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting closed loop radar interference identification and management). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a first wireless device in accordance with examples as disclosed herein. For example, the communications manager 1220 may be configured as or otherwise support a means for transmitting a first radar signal in a first frame over a time duration. The communications manager 1220 may be configured as or otherwise support a means for receiving, in a second frame of the time duration, a first reflected signal corresponding to the transmitted first radar signal. The communications manager 1220 may be configured as or otherwise support a means for monitoring a third frame that is subsequent to the first frame and the second frame for one or more interfering signals during a silence interval of the time duration, the silence interval associated with an absence of transmissions by the first wireless device.

Additionally or alternatively, the communications manager 1220 may support wireless communications at a first wireless device in accordance with examples as disclosed herein. For example, the communications manager 1220 may be configured as or otherwise support a means for transmitting, at a first time in a first frame, a first radar signal according to a radar transmission configuration for radar transmissions for the first wireless device. The communications manager 1220 may be configured as or otherwise support a means for receiving, in the first frame in response to the first radar signal, a set of multiple transmissions including one or more signal reflections and at least a second transmission from a second wireless device. The communications manager 1220 may be configured as or otherwise support a means for transmitting, to the second wireless device, a request to modify a timing offset for the second transmission in a second frame by the second wireless device, the timing offset corresponding to a range shift for the second transmission received by the first wireless device. The communications manager 1220 may be configured as or otherwise support a means for receiving, in accordance with the timing offset in the second frame, the second transmission from the second wireless device based on the request.

Additionally or alternatively, the communications manager 1220 may support wireless communications at a second wireless device in accordance with examples as disclosed herein. For example, the communications manager 1220 may be configured as or otherwise support a means for receiving, at a first time in a first frame, a first radar signal from a first wireless device. The communications manager 1220 may be configured as or otherwise support a means for transmitting, in response to receiving the first radar signal, a first transmission to the first wireless device in the first frame. The communications manager 1220 may be configured as or otherwise support a means for receiving, from the first wireless device, a request to modify a timing offset for a second transmission by the second wireless device, the timing offset corresponding to a range shift for the second transmission to be received by the first wireless device. The communications manager 1220 may be configured as or otherwise support a means for transmitting, in accordance with the timing offset in a second frame, the second transmission to the first wireless device based on the request.

By including or configuring the communications manager 1220 in accordance with examples as described herein, the device 1205 may support techniques for improved communication reliability, reduced latency, improved user experience related to reduced interference, more efficient utilization of communication resources, improved coordination between devices, reduced impacts from signaling interference, In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of closed loop radar interference identification and management as described herein, or the processor 1240 and the memory 1230 may be otherwise configured to perform or support such operations.

FIG. 13 shows a flowchart illustrating a method 1300 that supports closed loop radar interference identification and management in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include transmitting a first radar signal in a first frame over a time duration. The operations of 1305 may be performed in accordance with examples as disclosed herein. In some examples, aspects of the operations of 1305 may be performed by a radar signaling component 1125 as described with reference to FIG. 11.

At 1310, the method may include receiving, in a second frame of the time duration, a first reflected signal corresponding to the transmitted first radar signal. The operations of 1310 may be performed in accordance with examples as disclosed herein. In some examples, aspects of the operations of 1310 may be performed by a radar signaling reflection receive component 1130 as described with reference to FIG. 11.

At 1315, the method may include monitoring a third frame that is subsequent to the first frame and the second frame for one or more interfering signals during a silence interval of the time duration, the silence interval associated with an absence of transmissions by the first wireless device. The operations of 1315 may be performed in accordance with examples as disclosed herein. In some examples, aspects of the operations of 1315 may be performed by an interference monitoring component 1135 as described with reference to FIG. 11.

Figure 14:
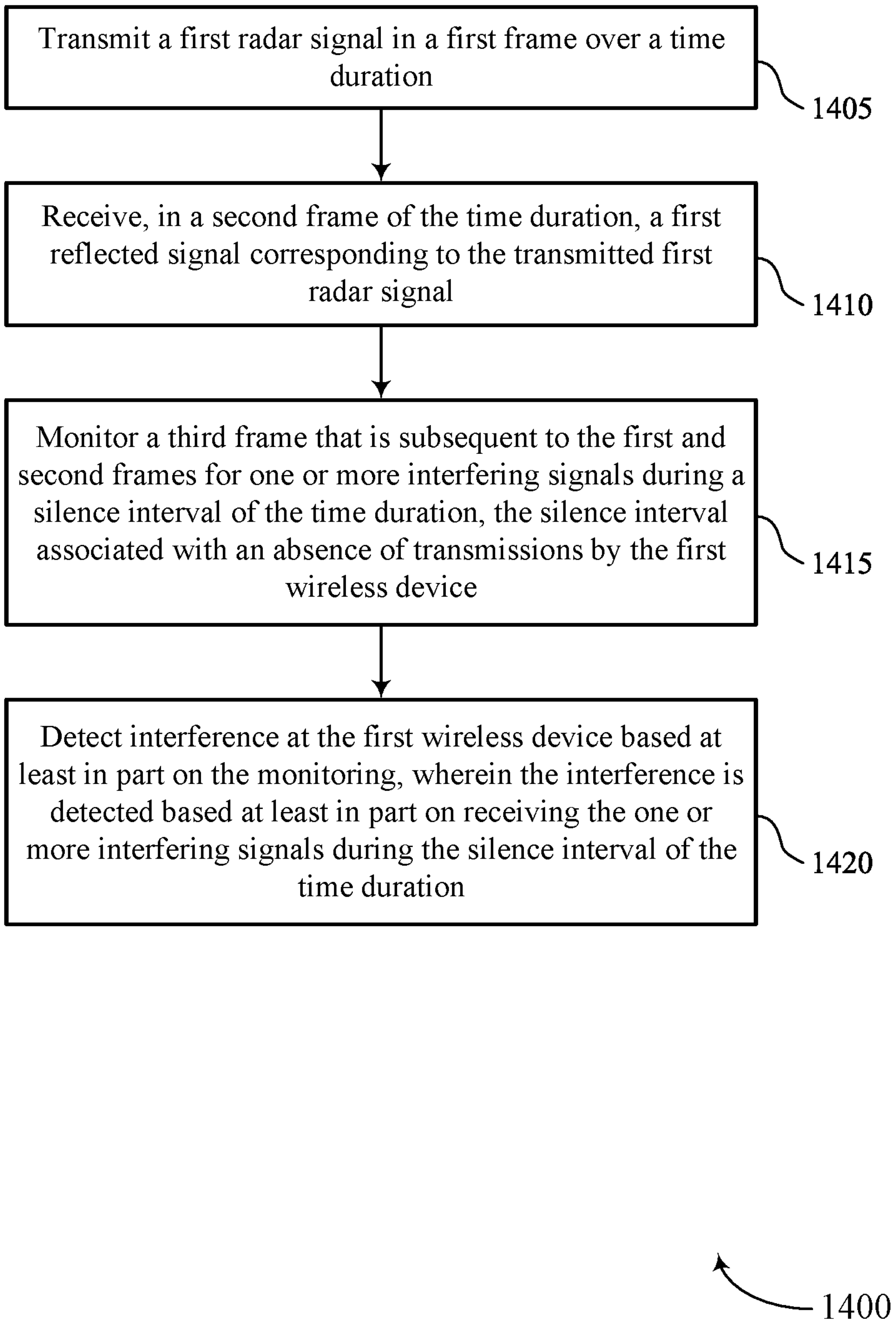

FIG. 14 shows a flowchart illustrating a method 1400 that supports closed loop radar interference identification and management in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include transmitting a first radar signal in a first frame over a time duration. The operations of 1405 may be performed in accordance with examples as disclosed herein. In some examples, aspects of the operations of 1405 may be performed by a radar signaling component 1125 as described with reference to FIG. 11.

At 1410, the method may include receiving, in a second frame of the time duration, a first reflected signal corresponding to the transmitted first radar signal. The operations of 1410 may be performed in accordance with examples as disclosed herein. In some examples, aspects of the operations of 1410 may be performed by a radar signaling reflection receive component 1130 as described with reference to FIG. 11.

At 1415, the method may include monitoring a third frame that is subsequent to the first frame and the second frame for one or more interfering signals during a silence interval of the time duration, the silence interval associated with an absence of transmissions by the first wireless device. The operations of 1415 may be performed in accordance with examples as disclosed herein. In some examples, aspects of the operations of 1415 may be performed by an interference monitoring component 1135 as described with reference to FIG. 11.

At 1420, the method may include detecting interference at the first wireless device based on the monitoring, where the interference is detected based on receiving the one or more interfering signals during the silence interval of the time duration. The operations of 1420 may be performed in accordance with examples as disclosed herein. In some examples, aspects of the operations of 1420 may be performed by an interference monitoring component 1135 as described with reference to FIG. 11.

FIG. 15 shows a flowchart illustrating a method 1500 that supports closed loop radar interference identification and management in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include transmitting a first radar signal in a first frame over a time duration. The operations of 1505 may be performed in accordance with examples as disclosed herein. In some examples, aspects of the operations of 1505 may be performed by a radar signaling component 1125 as described with reference to FIG. 11.

At 1510, the method may include receiving, in a second frame of the time duration, a first reflected signal corresponding to the transmitted first radar signal. The operations of 1510 may be performed in accordance with examples as disclosed herein. In some examples, aspects of the operations of 1510 may be performed by a radar signaling reflection receive component 1130 as described with reference to FIG. 11.

At 1515, the method may include monitoring a third frame that is subsequent to the first frame and the second frame for one or more interfering signals during a silence interval of the time duration, the silence interval associated with an absence of transmissions by the first wireless device.

The operations of 1515 may be performed in accordance with examples as disclosed herein. In some examples, aspects of the operations of 1515 may be performed by an interference monitoring component 1135 as described with reference to FIG. 11.

At 1520, the method may include determining an absence of interference at the first wireless device based on an absence of one or more interfering signals received during the silence interval. The operations of 1520 may be performed in accordance with examples as disclosed herein. In some examples, aspects of the operations of 1520 may be performed by an interference monitoring component 1135 as described with reference to FIG. 11.

FIG. 16 shows a flowchart illustrating a method 1600 that supports closed loop radar interference identification and management in accordance with aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include transmitting, at a first time in a first frame, a first radar signal according to a radar transmission configuration for radar transmissions for the first wireless device. The operations of 1605 may be performed in accordance with examples as disclosed herein. In some examples, aspects of the operations of 1605 may be performed by a radar signaling component 1125 as described with reference to FIG. 11.

At 1610, the method may include receiving, in the first frame in response to the first radar signal, a set of multiple transmissions including one or more signal reflections and at least a second transmission from a second wireless device. The operations of 1610 may be performed in accordance with examples as disclosed herein. In some examples, aspects of the operations of 1610 may be performed by a signaling receive component 1140 as described with reference to FIG. 11.

At 1615, the method may include transmitting, to the second wireless device, a request to modify a timing offset for the second transmission in a second frame by the second wireless device, the timing offset corresponding to a range shift for the second transmission received by the first wireless device. The operations of 1615 may be performed in accordance with examples as disclosed herein. In some examples, aspects of the operations of 1615 may be performed by a timing offset request component 1145 as described with reference to FIG. 11.

At 1620, the method may include receiving, in accordance with the timing offset in the second frame, the second transmission from the second wireless device based on the request. The operations of 1620 may be performed in accordance with examples as disclosed herein. In some examples, aspects of the operations of 1620 may be performed by a signaling receive component 1140 as described with reference to FIG. 11.

FIG. 17 shows a flowchart illustrating a method 1700 that supports closed loop radar interference identification and management in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include transmitting, at a first time in a first frame, a first radar signal according to a radar transmission configuration for radar transmissions for the first wireless device. The operations of 1705 may be performed in accordance with examples as disclosed herein. In some examples, aspects of the operations of 1705 may be performed by a radar signaling component 1125 as described with reference to FIG. 11.

At 1710, the method may include receiving, in the first frame in response to the first radar signal, a set of multiple transmissions including one or more signal reflections and at least a second transmission from a second wireless device. The operations of 1710 may be performed in accordance with examples as disclosed herein. In some examples, aspects of the operations of 1710 may be performed by a signaling receive component 1140 as described with reference to FIG. 11.

At 1715, the method may include transmitting, to the second wireless device, a request to modify a timing offset for the second transmission in a second frame by the second wireless device, the timing offset corresponding to a range shift for the second transmission received by the first wireless device. The operations of 1715 may be performed in accordance with examples as disclosed herein. In some examples, aspects of the operations of 1715 may be performed by a timing offset request component 1145 as described with reference to FIG. 11.

At 1720, the method may include receiving, in accordance with the timing offset in the second frame, the second transmission from the second wireless device based on the request. The operations of 1720 may be performed in accordance with examples as disclosed herein. In some examples, aspects of the operations of 1720 may be performed by a signaling receive component 1140 as described with reference to FIG. 11.

At 1725, the method may include determining whether the second transmission is a reflected signal corresponding to the transmitted first radar signal or whether the second transmission is interfering transmission based on the range shift. The operations of 1725 may be performed in accordance with examples as disclosed herein. In some examples, aspects of the operations of 1725 may be performed by a range shift determination component 1160 as described with reference to FIG. 11.

FIG. 18 shows a flowchart illustrating a method 1800 that supports closed loop radar interference identification and management in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include transmitting, at a first time in a first frame, a first radar signal according to a radar transmission configuration for radar transmissions for the first wireless device. The operations of 1805 may be performed in accordance with examples as disclosed herein. In some examples, aspects of the operations of 1805 may be performed by a radar signaling component 1125 as described with reference to FIG. 11.

At 1810, the method may include receiving, in the first frame in response to the first radar signal, a set of multiple transmissions including one or more signal reflections and at least a second transmission from a second wireless device. The operations of 1810 may be performed in accordance with examples as disclosed herein. In some examples, aspects of the operations of 1810 may be performed by a signaling receive component 1140 as described with reference to FIG. 11.

At 1815, the method may include identifying the second wireless device is a interfering wireless device associated with the first radar signal. The operations of 1815 may be performed in accordance with examples as disclosed herein. In some examples, aspects of the operations of 1815 may be performed by an interference monitoring component 1135 as described with reference to FIG. 11.

At 1820, the method may include modifying the timing offset associated with transmitting the first transmission or receiving the second transmission at the first wireless device based on the identifying. The operations of 1820 may be performed in accordance with examples as disclosed herein. In some examples, aspects of the operations of 1820 may be performed by a timing offset request component 1145 as described with reference to FIG. 11.

At 1825, the method may include transmitting, to the second wireless device, a request to modify a timing offset for the second transmission in a second frame by the second wireless device, the timing offset corresponding to a range shift for the second transmission received by the first wireless device. The operations of 1825 may be performed in accordance with examples as disclosed herein. In some examples, aspects of the operations of 1825 may be performed by a timing offset request component 1145 as described with reference to FIG. 11.

At 1830, the method may include receiving, in accordance with the timing offset in the second frame, the second transmission from the second wireless device based on the request. The operations of 1830 may be performed in accordance with examples as disclosed herein. In some examples, aspects of the operations of 1830 may be performed by a signaling receive component 1140 as described with reference to FIG. 11.

Figure 19:
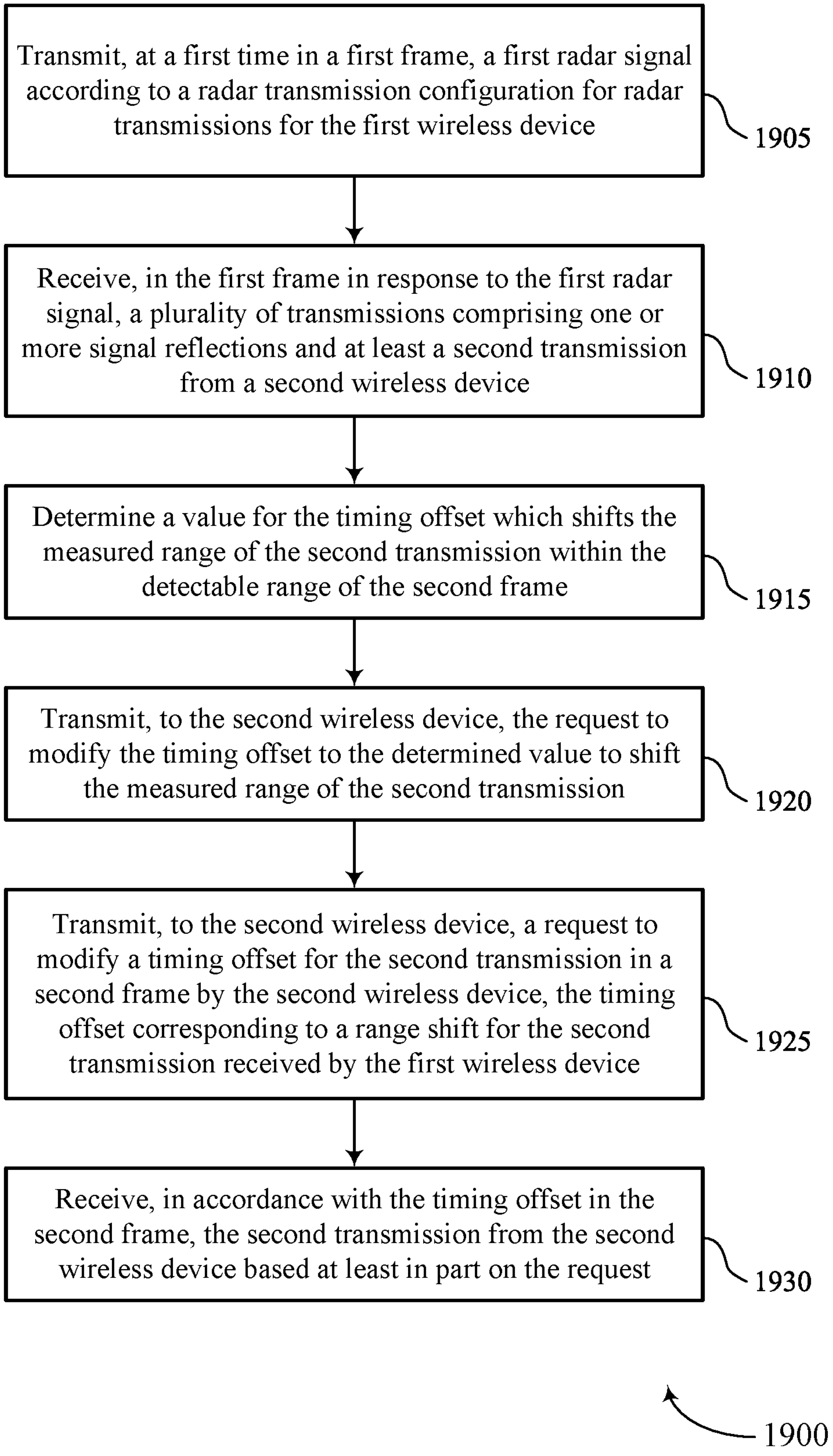

FIG. 19 shows a flowchart illustrating a method 1900 that supports closed loop radar interference identification and management in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include transmitting, at a first time in a first frame, a first radar signal according to a radar transmission configuration for radar transmissions for the first wireless device. The operations of 1905 may be performed in accordance with examples as disclosed herein. In some examples, aspects of the operations of 1905 may be performed by a radar signaling component 1125 as described with reference to FIG. 11.

At 1910, the method may include receiving, in the first frame in response to the first radar signal, a set of multiple transmissions including one or more signal reflections and at least a second transmission from a second wireless device. The operations of 1910 may be performed in accordance with examples as disclosed herein. In some examples, aspects of the operations of 1910 may be performed by a signaling receive component 1140 as described with reference to FIG. 11.

At 1915, the method may include determining a value for the timing offset which shifts the measured range of the second transmission within the detectable range of the second frame. The operations of 1915 may be performed in accordance with examples as disclosed herein. In some examples, aspects of the operations of 1915 may be performed by a timing offset determination component 1170 as described with reference to FIG. 11.

At 1920, the method may include transmitting, to the second wireless device, the request to modify the timing offset to the determined value to shift the measured range of the second transmission. The operations of 1920 may be performed in accordance with examples as disclosed herein. In some examples, aspects of the operations of 1920 may be performed by a timing offset request component 1145 as described with reference to FIG. 11.

At 1925, the method may include transmitting, to the second wireless device, a request to modify a timing offset for the second transmission in a second frame by the second wireless device, the timing offset corresponding to a range shift for the second transmission received by the first wireless device. The operations of 1925 may be performed in accordance with examples as disclosed herein. In some examples, aspects of the operations of 1925 may be performed by a timing offset request component 1145 as described with reference to FIG. 11.

At 1930, the method may include receiving, in accordance with the timing offset in the second frame, the second transmission from the second wireless device based on the request. The operations of 1930 may be performed in accordance with examples as disclosed herein. In some examples, aspects of the operations of 1930 may be performed by a signaling receive component 1140 as described with reference to FIG. 11.

FIG. 20 shows a flowchart illustrating a method 2000 that supports closed loop radar interference identification and management in accordance with aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2005, the method may include receiving, at a first time in a first frame, a first radar signal from a first wireless device. The operations of 2005 may be performed in accordance with examples as disclosed herein. In some examples, aspects of the operations of 2005 may be performed by a signaling receive component 1140 as described with reference to FIG. 11.

At 2010, the method may include transmitting, in response to receiving the first radar signal, a first transmission to the first wireless device in the first frame. The operations of 2010 may be performed in accordance with examples as disclosed herein. In some examples, aspects of the operations of 2010 may be performed by a radar signaling response component 1150 as described with reference to FIG. 11.

At 2015, the method may include receiving, from the first wireless device, a request to modify a timing offset for a second transmission by the second wireless device, the timing offset corresponding to a range shift for the second transmission to be received by the first wireless device. The operations of 2015 may be performed in accordance with examples as disclosed herein. In some examples, aspects of the operations of 2015 may be performed by a timing offset request component 1145 as described with reference to FIG. 11.

At 2020, the method may include transmitting, in accordance with the timing offset in a second frame, the second transmission to the first wireless device based on the request. The operations of 2020 may be performed in accordance with examples as disclosed herein. In some examples, aspects of the operations of 2020 may be performed by a timing offset application component 1155 as described with reference to FIG. 11.

The following provides an overview of aspects of the present disclosure:

Aspect 1: A method for wireless communications at a first wireless device, comprising: transmitting a first radar signal in a first frame over a time duration; receiving, in a second frame of the time duration, a first reflected signal corresponding to the transmitted first radar signal; and monitoring a third frame that is subsequent to the first frame and the second frame for one or more interfering signals during a silence interval of the time duration, the silence interval associated with an absence of transmissions by the first wireless device.

Aspect 2: The method of aspect 1, further comprising: detecting interference at the first wireless device based at least in part on the monitoring, wherein the interference is detected based at least in part on receiving the one or more interfering signals during the silence interval of the time duration.

Aspect 3: The method of aspect 2, wherein detecting the one or more interfering signals at the first wireless device further comprises: mixing the one or more interfering signals with a virtual waveform, wherein the virtual waveform is based at least in part on the first radar signal transmitted in the first frame.

Aspect 4: The method of any of aspects 2 through 3, further comprising: transmitting a second radar signal in a fourth frame; receiving a second reflected signal based at least in part on tracking the interference from the one or more interfering signals by the first wireless device, wherein the one or more interfering signals are different from the second reflected signal corresponding to the second radar signal.

Aspect 5: The method of any of aspects 1 through 4, further comprising: determining an absence of interference at the first wireless device based at least in part on an absence of one or more interfering signals received during the silence interval.

Aspect 6: A method for wireless communications at a first wireless device, comprising: transmitting, at a first time in a first frame, a first radar signal according to a radar transmission configuration for radar transmissions for the first wireless device; receiving, in the first frame in response to the first radar signal, a plurality of transmissions comprising one or more signal reflections and at least a second transmission from a second wireless device; transmitting, to the second wireless device, a request to modify a timing offset for the second transmission in a second frame by the second wireless device, the timing offset corresponding to a range shift for the second transmission received by the first wireless device; and receiving, in accordance with the timing offset in the second frame, the second transmission from the second wireless device based at least in part on the request.

Aspect 7: The method of aspect 6, further comprising: determining whether the second transmission is a reflected signal corresponding to the transmitted first radar signal or whether the second transmission is interfering transmission based at least in part on the range shift.

Aspect 8: The method of any of aspects 6 through 7, wherein receiving the plurality of transmissions and the second transmission further comprises: receiving the second transmission in accordance with the timing offset, the timing offset corresponding to a change in a generated beat frequency relative to a first transmission, the change in the generated beat frequency further associated with the range shift.

Aspect 9: The method of any of aspects 6 through 8, further comprising: transmitting the request to modify the timing offset in a sidelink control information message, wherein the sidelink control information message further comprises a field which identifies position information of the first wireless device.

Aspect 10: The method of any of aspects 6 through 9, wherein the request to modify the timing offset further includes a request for the second wireless device to identify itself as an interfering device based at least in part on a distance between the first wireless device and the second wireless device, a field of view overlap, position information of the first wireless device and the second wireless device, or any combination thereof, the method further comprising: establishing a unicast link with the second wireless device based at least in part on the second wireless device being identified as the interfering device.

Aspect 11: The method of any of aspects 6 through 10, further comprising: identifying the second wireless device is a interfering wireless device associated with the first radar signal; and modifying the timing offset associated with transmitting the first transmission or receiving the second transmission at the first wireless device based at least in part on the identifying.

Aspect 12: The method of any of aspects 6 through 11, wherein the request to modify the timing offset is a broadcast message transmitted to the second wireless device and at least a third wireless device, the method further comprising: transmitting the request to modify the timing offset to the second wireless device and the third wireless device, wherein the timing offset is the same or different for both the second wireless device and the third wireless device.

Aspect 13: The method of any of aspects 6 through 12, wherein a range of the second transmission is within a detectable range of the second frame, the method further comprising: determining a value for the timing offset which shifts the measured range of the second transmission outside of the detectable range of the second frame; and transmitting, to the second wireless device, the request to modify the timing offset to the determined value to shift the measured range of the second transmission.

Aspect 14: The method of any of aspects 6 through 13, wherein the measured range of the second transmission is outside a detectable range of the second frame, the method further comprising: determining a value for the timing offset which shifts the measured range of the second transmission within the detectable range of the second frame; and transmitting, to the second wireless device, the request to modify the timing offset to the determined value to shift the measured range of the second transmission.

Aspect 15: The method of any of aspects 6 through 14, further comprising: transmitting the request to modify the timing offset for the second transmission in a unicast message to the second wireless device or in a groupcast message to the second wireless device and at least one other additional wireless device.

Aspect 16: The method of any of aspects 6 through 15, further comprising: transmitting the request to modify the timing offset for the second transmission in accordance with a semi-persistent scheduling configuration, wherein the first wireless device reserves a set of periodic resources for transmitting the request.

Aspect 17: The method of aspect 16, further comprising: identifying one or more updates to the request outside of the set of periodic resources of the semi-persistent scheduling configuration; and transmitting the one or more updates to the request using resources outside of the semi-persistent scheduling configuration.

Aspect 18: The method of any of aspects 6 through 17, wherein the timing offset comprises a timing advance or a timing delay relative to a timing of the first frame.

Aspect 19: A method for wireless communications at a second wireless device, comprising: receiving, at a first time in a first frame, a first radar signal from a first wireless device; transmitting, in response to receiving the first radar signal, a first transmission to the first wireless device in the first frame; receiving, from the first wireless device, a request to modify a timing offset for a second transmission by the second wireless device, the timing offset corresponding to a range shift for the second transmission to be received by the first wireless device; and transmitting, in accordance with the timing offset in a second frame, the second transmission to the first wireless device based at least in part on the request.

Aspect 20: The method of aspect 19, wherein transmitting the second transmission to the first wireless device further comprises: transmitting the second transmission in accordance with the timing offset, the timing offset corresponding to a change in a generated beat frequency relative to the first transmission, the change in the generated beat frequency further associated with the range shift.

Aspect 21: The method of any of aspects 19 through 20, further comprising: receiving the request to modify the timing offset in a sidelink control information message, wherein the sidelink control information message further comprises a field which identifies position information of the first wireless device.

Aspect 22: The method of any of aspects 19 through 21, wherein the request to modify the timing offset further includes a request for the second wireless device to identify itself as an interfering device based at least in part on a distance between the first wireless device and the second wireless device, a field of view overlap, position information of the first wireless device and the second wireless device, or any combination thereof, the method further comprising: establishing a unicast link with the first wireless device based at least in part on the first wireless device being identified as the interfering device.

Aspect 23: The method of any of aspects 19 through 22, further comprising: receiving the timing offset associated with transmitting the second transmission to the first wireless device based at least in part on the second wireless device being an interfering wireless device.

Aspect 24: The method of any of aspects 19 through 23, wherein the request to modify the timing offset is a broadcast message transmitted by the first wireless device to the second wireless device and at least a third wireless device, the method further comprising: receiving the request to modify the timing offset, wherein the timing offset is the same or different for both the second wireless device and the third wireless device.

Aspect 25: The method of any of aspects 19 through 24, further comprising: receiving, from the first wireless device in a unicast message or in a groupcast message, the request to modify the timing offset for the second transmission.

Aspect 26: The method of any of aspects 19 through 25, further comprising: receiving the request to modify the timing offset for the second transmission on a set of periodic resources in accordance with a semi-persistent scheduling configuration.

Aspect 27: The method of aspect 26, further comprising: receiving one or more updates to the request using resources outside of the semi-persistent scheduling configuration.

Aspect 28: The method of any of aspects 19 through 27, wherein the timing offset comprises a timing advance or a timing delay relative to a timing of the first frame.

Aspect 29: An apparatus for wireless communications at a first wireless device, comprising a processor; memory coupled with the processor; and instructions stored in the memory and executable by the processor to cause the apparatus to perform a method of any of aspects 1 through 5.

Aspect 30: An apparatus for wireless communications at a first wireless device, comprising at least one means for performing a method of any of aspects 1 through 5.

Aspect 31: A non-transitory computer-readable medium storing code for wireless communications at a first wireless device, the code comprising instructions executable by a processor to perform a method of any of aspects 1 through 5.

Aspect 32: An apparatus for wireless communications at a first wireless device, comprising a processor; memory coupled with the processor; and instructions stored in the memory and executable by the processor to cause the apparatus to perform a method of any of aspects 6 through 18.

Aspect 33: An apparatus for wireless communications at a first wireless device, comprising at least one means for performing a method of any of aspects 6 through 18.

Aspect 34: A non-transitory computer-readable medium storing code for wireless communications at a first wireless device, the code comprising instructions executable by a processor to perform a method of any of aspects 6 through 18.

Aspect 35: An apparatus for wireless communications at a second wireless device, comprising a processor; memory coupled with the processor; and instructions stored in the memory and executable by the processor to cause the apparatus to perform a method of any of aspects 19 through 28.

Aspect 36: An apparatus for wireless communications at a second wireless device, comprising at least one means for performing a method of any of aspects 19 through 28.

Aspect 37: A non-transitory computer-readable medium storing code for wireless communications at a second wireless device, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:

transmitting, at a first time in a first frame, a first radar signal according to a radar transmission configuration for radar transmissions for the first wireless device;

receiving, in the first frame in response to the first radar signal, a plurality of transmissions comprising one or more signal reflections and at least a second transmission from a second wireless device;

transmitting, to the second wireless device, a request to modify a timing offset for the second transmission in a second frame by the second wireless device, the timing offset corresponding to a range shift for the second transmission received by the first wireless device; and receiving, in accordance with the timing offset in the second frame, the second transmission from the second wireless device based at least in part on the request.

2. The method of claim 1, further comprising:

determining whether the second transmission is a reflected signal corresponding to the transmitted first radar signal or whether the second transmission is an interfering transmission based at least in part on the range shift.

3. The method of claim 1, wherein receiving the plurality of transmissions and the second transmission further comprises:

receiving the second transmission in accordance with the timing offset, the timing offset corresponding to a change in a generated beat frequency relative to a first transmission, the change in the generated beat frequency further associated with the range shift.

4. The method of claim 1, further comprising:

transmitting the request to modify the timing offset in a sidelink control information message, wherein the sidelink control information message further comprises a field which identifies position information of the first wireless device.

5. The method of claim 1, wherein the request to modify the timing offset further includes a request for the second wireless device to identify itself as an interfering device based at least in part on a distance between the first wireless device and the second wireless device, a field of view overlap, position information of the first wireless device and the second wireless device, or any combination thereof, the method further comprising:

establishing a unicast link with the second wireless device based at least in part on the second wireless device being identified as the interfering device.

6. The method of claim 1, further comprising:

identifying the second wireless device is a interfering wireless device associated with the first radar signal; and modifying the timing offset associated with transmitting the first radar signal or receiving the second transmission at the first wireless device based at least in part on the identifying.

7. The method of claim 1, wherein the request to modify the timing offset is a broadcast message transmitted to the second wireless device and at least a third wireless device, the method further comprising:

transmitting the request to modify the timing offset to the second wireless device and the third wireless device, wherein the timing offset is the same or different for both the second wireless device and the third wireless device.

8. The method of claim 1, wherein a range of the second transmission is within a detectable range of the second frame, the method further comprising:

determining a value for the timing offset which shifts a measured range of the second transmission outside of the detectable range of the second frame; and transmitting, to the second wireless device, the request to modify the timing offset to the determined value to shift the measured range of the second transmission.

9. The method of claim 1, wherein a measured range of the second transmission is outside a detectable range of the second frame, the method further comprising:

determining a value for the timing offset which shifts the measured range of the second transmission within the detectable range of the second frame; and transmitting, to the second wireless device, the request to modify the timing offset to the determined value to shift the measured range of the second transmission.

10. The method of claim 1, further comprising:

transmitting the request to modify the timing offset for the second transmission in a unicast message to the second wireless device or in a groupcast message to the second wireless device and at least one other additional wireless device.

11. The method of claim 1, further comprising:

transmitting the request to modify the timing offset for the second transmission in accordance with a semi-persistent scheduling configuration, wherein the first wireless device reserves a set of periodic resources for transmitting the request.

12. The method of claim 11, further comprising:

identifying one or more updates to the request outside of the set of periodic resources of the semi-persistent scheduling configuration; and transmitting the one or more updates to the request using resources outside of the semi-persistent scheduling configuration.

13. The method of claim 1, wherein the timing offset comprises a timing advance or a timing delay relative to a timing of the first frame.

14. A method for wireless communications at a second wireless device, comprising:

receiving, at a first time in a first frame, a first radar signal from a first wireless device;

transmitting, in response to receiving the first radar signal, a first transmission to the first wireless device in the first frame;

receiving, from the first wireless device, a request to modify a timing offset for a second transmission by the second wireless device, the timing offset corresponding to a range shift for the second transmission to be received by the first wireless device; and transmitting, in accordance with the timing offset in a second frame, the second transmission to the first wireless device based at least in part on the request.

15. The method of claim 14, wherein transmitting the second transmission to the first wireless device further comprises:

transmitting the second transmission in accordance with the timing offset, the timing offset corresponding to a change in a generated beat frequency relative to the first transmission, the change in the generated beat frequency further associated with the range shift.

16. The method of claim 14, further comprising: receiving the request to modify the timing offset in a sidelink control information message, wherein the sidelink control information message further comprises a field which identifies position information of the first wireless device.

17. The method of claim 14, wherein the request to modify the timing offset further includes a request for the second wireless device to identify itself as an interfering device based at least in part on a distance between the first wireless device and the second wireless device, a field of view overlap, position information of the first wireless device and the second wireless device, or any combination thereof, the method further comprising:

establishing a unicast link with the first wireless device based at least in part on the first wireless device being identified as the interfering device.

18. The method of claim 14, further comprising: receiving the timing offset associated with transmitting the second transmission to the first wireless device based at least in part on the second wireless device being an interfering wireless device.

19. The method of claim 14, wherein the request to modify the timing offset is a broadcast message transmitted by the first wireless device to the second wireless device and at least a third wireless device, the method further comprising:

receiving the request to modify the timing offset, wherein the timing offset is the same or different for both the second wireless device and the third wireless device.

20. The method of claim 14, further comprising: receiving, from the first wireless device in a unicast message or in a groupcast message, the request to modify the timing offset for the second transmission.

21. The method of claim 14, further comprising: receiving the request to modify the timing offset for the second transmission on a set of periodic resources in accordance with a semi-persistent scheduling configuration.

22. The method of claim 21, further comprising: receiving one or more updates to the request using resources outside of the semi-persistent scheduling configuration.

23. The method of claim 14, wherein the timing offset comprises a timing advance or a timing delay relative to a timing of the first frame.

24. An apparatus for wireless communications at a first wireless device, comprising:

a processor;

memory coupled with the processor; and instructions stored in the memory and executable by the processor to cause the apparatus to:

transmit, at a first time in a first frame, a first radar signal according to a radar transmission configuration for radar transmissions for the first wireless device;

receive, in the first frame in response to the first radar signal, a plurality of transmissions comprising one or more signal reflections and at least a second transmission from a second wireless device;

transmit, to the second wireless device, a request to modify a timing offset for the second transmission in a second frame by the second wireless device, the timing offset corresponding to a range shift for the second transmission received by the first wireless device; and receive, in accordance with the timing offset in the second frame, the second transmission from the second wireless device based at least in part on the request.

25. The apparatus of claim 24, wherein the instructions are executable by the processor to cause the apparatus to: determine whether the second transmission is a reflected signal corresponding to the transmitted first radar signal or whether the second transmission is an interfering transmission based at least in part on the range shift.

26. The apparatus of claim 24, wherein, to receive the plurality of transmissions and the second transmission, the instructions are executable by the processor to cause the apparatus to:

receive the second transmission in accordance with the timing offset, the timing offset corresponding to a change in a generated beat frequency relative to a first transmission, the change in the generated beat frequency further associated with the range shift.

27. The apparatus of claim 24, wherein the instructions are executable by the processor to cause the apparatus to: transmit the request to modify the timing offset in a sidelink control information message, wherein the sidelink control information message further comprises a field which identifies position information of the first wireless device.

28. The apparatus of claim 24, wherein the instructions are executable by the processor to cause the apparatus to:

identify the second wireless device is a interfering wireless device associated with the first radar signal; and modify the timing offset associated with transmission of the first radar signal or receipt of the second transmission at the first wireless device based at least in part on identification that the second wireless device is the interfering wireless device associated with the first radar signal.

29. The apparatus of claim 24, wherein the instructions are executable by the processor to cause the apparatus to: transmit the request to modify the timing offset for the second transmission in a unicast message to the second wireless device or in a groupcast message to the second wireless device and at least one other additional wireless device.

30. The apparatus of claim 24, wherein the instructions are executable by the processor to cause the apparatus to: transmit the request to modify the timing offset for the second transmission in accordance with a semi-persistent scheduling configuration, wherein the first wireless device reserves a set of periodic resources for transmission of the request.

* * * * *